United States Patent [19]

Yamada

[11] 4,156,880
[45] May 29, 1979

[54] METHOD FOR TRANSMITTING A FACSIMILE SIGNAL BY SEQUENTIAL EDGE DIFFERENTIAL CODING

[75] Inventor: Toyomichi Yamada, Hachioji, Japan

[73] Assignee: Nippon Telegraph and Telephone Public Corporation, Japan

[21] Appl. No.: 810,746

[22] Filed: Jun. 28, 1977

[30] Foreign Application Priority Data

Jun. 28, 1976 [JP] Japan .................................. 51-76917

[51] Int. Cl.² ............................................ H04N 7/12
[52] U.S. Cl. ...................................... 358/261; 358/135
[58] Field of Search ............... 358/260, 261, 262, 133, 358/135; 340/146.3 AE

[56] References Cited

U.S. PATENT DOCUMENTS

| 3,927,251 | 12/1975 | White et al. | 358/261 |
| 3,991,267 | 11/1976 | Beaudette | 358/260 |

*Primary Examiner*—Robert L. Griffin
*Assistant Examiner*—Edward L. Coles
*Attorney, Agent, or Firm*—Staas & Halsey

[57] ABSTRACT

A method and apparatus for removing redundancy of scan data of pictures by coding it to reduce the transmission time or compress the transmission bandwidth. The edge states between white and black areas on the preceding line and the current line are classified into a First state in which the edge on the preceding line continues to the current line, a Second state in which the edge on the preceding line turns up on the same line, and a Third state in which the edge on the current line turns down on the same line. In the First state, the difference in the location of the edge between adjacent lines is coded; in the Second state, coding is effected only by a state code; and in the Third state, the distance between the position of the previous state and the position of the first edge and the distance between the later and the position of the next edge are coded. Since the current line can be coded only processing the preceding line and the current line one-directionally and simultaneously, implementation of a coder becomes simple. Further, since correlation between adjacent scan lines is utilized, redundancy can be effectively removed regardless of whether the document is simple or complicated.

17 Claims, 27 Drawing Figures

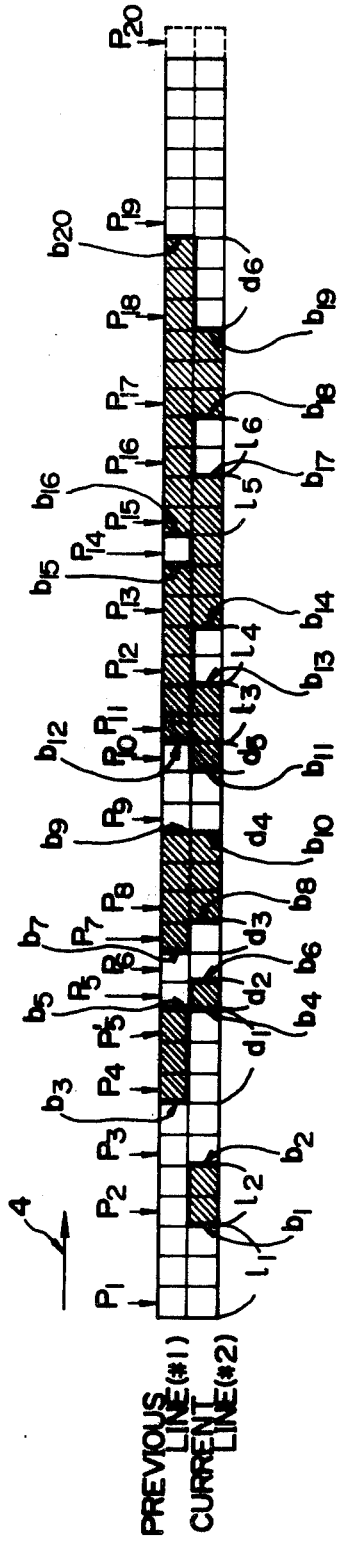
FIG. 11
FIG. 12
$S_3 \cdot L(3) \cdot L(2) \cdot S_1 \cdot D(+3) \cdot S_1 \cdot D(+1) \cdot S_1 \cdot D(0) \cdot S_1 \cdot D(-1) \cdot S_3 \cdot L(2) \cdot L(2) \cdot S_2 \cdot S_3 \cdot L(2) \cdot L(2) \cdot S_1 \cdot D(-3)$
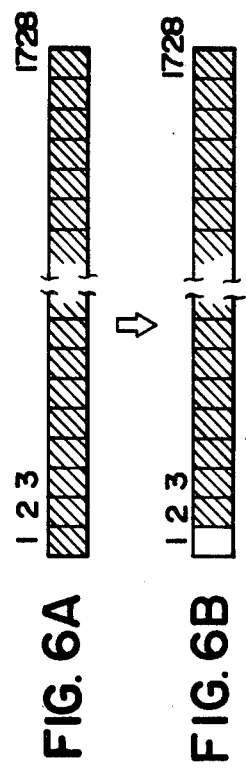
FIG. 6A
FIG. 6B
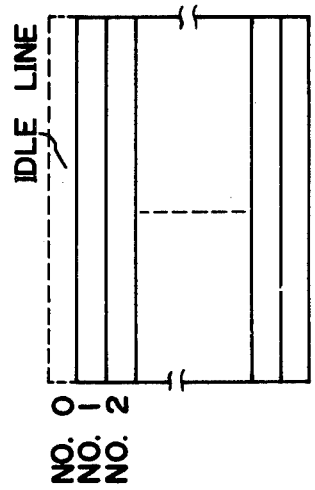
FIG. 5

FIG. 7
| | PRIORITY | IDENTIFIED STATES |
|---|---|---|
| A | $E_1 > E_2$<br>$E_1 > E_3$ | |
| B | $E_2 > E_1 > E_3$ | |
| C | $E_3 > E_1 > E_2$ | |
| D | $E_2 > E_1$<br>$E_3 > E_1$ | |
FIG. 8
| #1 | IDLE LINE |
|---|---|
| #2 | IDLE LINE |
$S_1 \cdot D(0)$
FIG. 9
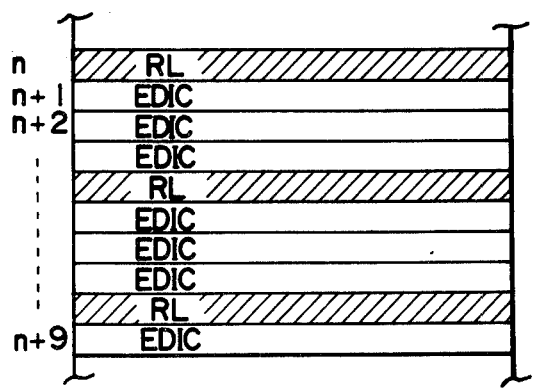
FIG. 10
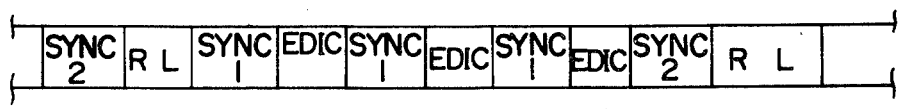

METHOD FOR TRANSMITTING A FACSIMILE SIGNAL BY SEQUENTIAL EDGE DIFFERENTIAL CODING

BACKGROUND OF THE INVENTION

1. Field of the Invention

This invention relates to facsimile signal redundancy reduction coding and transmission, and more particularly to a method and apparatus for sequential edge difference coding and transmission of a binary signal, in which method and apparatus picture is scanned so as to be resolved into picture elements (pels) of a first level (for example, a black level) and a second level (for example, a white level), and in which the edge states between the first and second levels between the current line to be coded and the line immediately preceding it are coded and transmitted.

2. Description of the Prior Art

In recent years, facsimile has become known as a simple method of transmitting documents, and has been put into wide use and developed. However, the amount of facsimile signal obtained by scanning an original document is enormous. For example, in the case of sampling a document of JIS-A4 (210×297 mm) with a sampling density of 8 pels/mm both in main- and sub-scanning directions and producing a binary representation, the amount of facsimile signal reaches about $4 \times 10^6$ bits. Therefore, much time is needed for directly transmitting the signals and a large capacity memory is required for storing them.

Then, various redundancy reduction coding schemes have been proposed for highly efficient transmission of facsimile signals. These schemes all take advantage of the redundancy within the facsimile signal and reduce the number of bits to be transmitted or stored by the technique of redundancy reduction coding without impairment of picture quality.

The fundamental idea of the redundancy reduction coding scheme is to identify a signal train having redundancy as a sequence of successive states, and to represent each of the states by variable length codes in accordance with the frequency of occurrence of each state.

The most excellent one of the conventional coding schemes is the two-dimensional sequential coding scheme which performs coding by sequentially making use of correlation between adjacent scan lines.

For the two-dimensional sequential coding scheme, refer to the following literatures:

(i) The Institute of Television Engineers of Japan, The Society for the Study of Picture Transmission, research material 17-6 (1975-10), Yamada, Togashi and Yuki "Modified Predictive Differential Quantizing (PDQ) for Facsimile Signals."

(ii) The Institute of Electronics and Communication Engineers of Japan, Department of Communication, General Meeting in 1976, manuscript S5-5 (1976), Yamada and Kawade, "On a Predictive Differential Quantizing in Patterns for Facsimile Signals."

(iii) The Institute of Electronics and Communication Engineers of Japan, the Society for the Study of Communication System, research material CS74-115 (1974-11), Wakahara (Kokusai Denshin Denwa K.K.), "Relative Address Coding Scheme."

(iv) British Pat. No. 1,307,777 Specification (v) U.S. Pat. No. 3,991,267 Specification (vi) Japanese Patent Laid-Open No. 1851/1976 Gazette (vii) French Patent No. 1,548,366 Specification (vii) ICC 1969 (11-21~11-28) V. M. Tyler (EG & G) "Two Handcopy Terminal for PCM Communication of Meteorological Products."

(ix) Picture Bandwidth Compression. Goden, Breach & C. G. Beaudette "An Efficient Facsimile System for Weather Graphics"

(x) Picture Bandwidth Compression. Goden, Breach & T. S. Huang "Run-Length Coding and its Extensions".

However, the above said methods have defects in that the coding algorithm is complicated, that a high compression ratio cannot be obtained, that even if a high compression ratio can be obtained in connection with either one of simple and complicated documents, a sufficiently high compression ratio cannot be obtained in connection with the other, and that implementation becomes complicated. Accordingly, there is still room for improvements.

The contents of above said literatures (iv), (v), (vi), (viii), (ix) and (x) relate to the PDQ scheme disclosed in British Pat. No 1,307,777.

Briefly stated, the PDQ scheme is as follows: When coding a signal of the current line while sequentially comparing signals of two adjacent scan lines, a difference $\Delta I$ in the black run starting position between corresponding portions on both scan lines and a difference $\Delta II$ in the black run length between the abovesaid corresponding portions are measured, and the two functions $\Delta I$ and $\Delta II$ are coded in a pair. Accordingly, especially in the case of a complicated document, the absolute value of the function $\Delta II$ becomes large so as to lessen the effect of redundancy reduction, so that a high compression ratio cannot be obtained. Further, since both functions $\Delta I$ and $\Delta II$ are coded in a pair, implementation becomes complicated.

Next, the method set forth in the abovesaid French Pat. No. 1,548,366 is such that, in connection with the pel arrangement that the positions of pels on the preceding and current lines adjacent to each other are shifted by $\frac{1}{2}$ pel relative to each other, black run lengths on the both lines are classified and coded. That is, the pel arrangement is interleaved and notice is taken of a pair of black runs, and the difference between the leading point and the lagging point of the overlapping black runs are coded in a pair and, at the same time, an address is coded for coding of the leading point of the run length. Accordingly, coding in a pair makes implementation complicated and, since address coding is not efficient, a high compression ratio cannot be obtained in the case of a complicated document.

Next, the relative address coding scheme proposed in the abovesaid literature (iii) is such that a new transition point is coded with the relative address from the basic point which is the nearest one of the adjoining transition points already coded. This is based on the idea that images on the document are examined upwards, so that if the document is complicated, there is no correlation between the new transition point, and the basic point and the relative distance becomes large, and the effect of redundancy reduction is lessened.

Further, the technique of predictive differential quantizing in patterns proposed by the present inventors in the abovesaid literature (ii) amounts to classifying the way of connection of black portions on two adjacent scan lines into five kinds and coding them. This scheme is more satisfactory than the abovesaid relative address coding scheme in which images on the document are examined downwards. Further, this has been reformed from the abovesaid PDQ scheme but implementation is relatively complicated.

SUMMARY OF THE INVENTION

An object of this invention is to save transmission time or compress a required transmission bandwidth by removing redundancy of a facsimile signal and by converting an original signal to a smaller number of code bits.

Another object of this invention is to enhance the effect of redundancy reduction regardless of whether a document is simple or complicated.

Another object of this invention is to simplify implementation of a coder and a decoder.

Another object of this invention is to remove redundancy of a two-tone facsimile signal with black and white levels by digital coding without picture quality impairment, thereby to reduce the memory capacity in the case of storing the facsimile signal.

Another object of this invention is to identify and code edge states by only one scanning of picture signals on the preceding line and the current line in the main scanning direction.

Still another object of this invention is to prevent the propagation of code error influences.

The sequential edge difference coding and transmitting method according to this invention is as follows: In a binary signal coding and transmission method in which an original document is scanned along each of adjacent scan lines, a picture signal on the scan line is sampled and provided in a binary representation (that is, represented with two-level pels having a first or second level), the scan lines are sequentially coded, the preceding line which is already coded and adjacent to the current line to be coded and the current line are simultaneously observed, and edges between the pel of the first level and the pel of the second level on the two scan lines, or transition points at which the level of the pel varies from one to the other level, are examined. A First state in which the edge on the preceding line continues to the current line (that is, a state in which two transition points observed successively on the two lines along a scan line respectively exist on the preceding line and the current line), a Second state in which the edge on the preceding line turns up on the same line (that is, a state in which two transition points observed successively on the two lines along a scan line exist only on the preceding line), and a Third state in which the edge on the current line turns down on the current line (that is, a state in which two transition points observed successively on the two lines along a scan line exist only on the current line), are respectively identified, and each of the identified state is coded into a binary digital signal and transmitted.

BRIEF DESCRIPTION OF THE DRAWINGS

FIG. 5 is a diagram explanatory of a method of coding a first line of an original document;

FIGS. 6A and 6B are diagrams explanatory of a first pel of each scanning line in the prior art and in this invention;

FIG. 7 is a diagram explanatory of identification priority in the case where edges cross each other in this invention;

FIG. 8 is a diagram explanatory of a coding method in the case where the preceding line and the current line are both idle lines;

FIG. 9 is a diagram explanatory of a method of preventing the propagation of error influences according to this invention;

FIG. 10 is a diagram explanatory of an error detecting and recovery code sequence;

FIG. 11 is a diagrammatic representation of scan data of the preceding line and the current line;

FIG. 12 is a diagram showing in function an example of coded scan data of FIG. 11;

DESCRIPTION OF THE PREFERRED EMBODIMENTS

Figure 1:
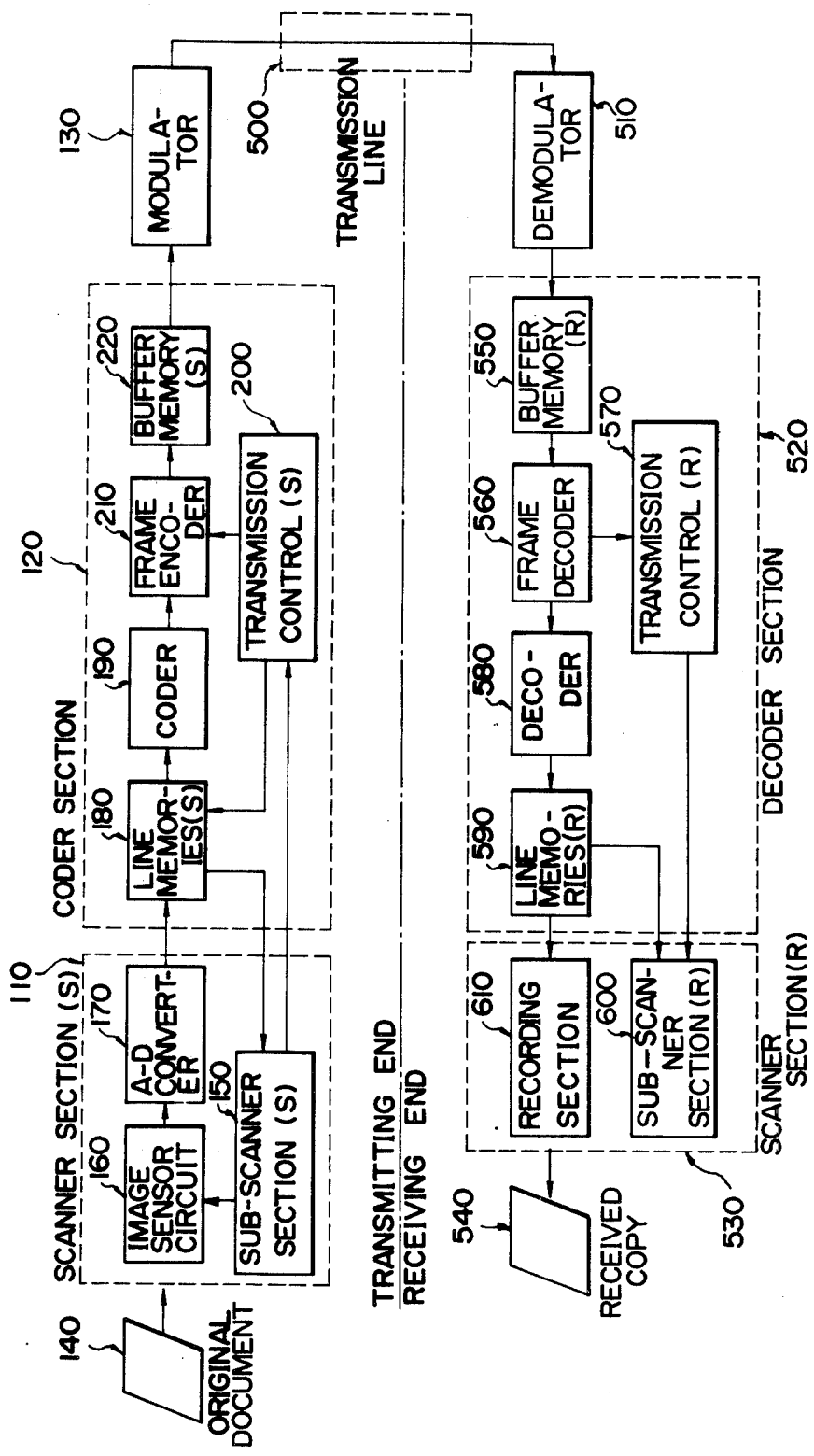
FIG. 1 is a block diagram showing a facsimile signal transmitting and receiving system.

In FIG. 1, there is shown an effective embodiment of a facsimile signal transmission system embodying this invention. The present embodiment is shown to be composed of a transmitting end, a transmission line 500, and a receiving end. The transmitting end includes a scanner section (S) 110, a coder section 120 and a modulator 130. The scanner section (S) 110 produces a digital representation of a facsimile signal by scanning an original document 140. A sub-scanner section (S) 150 arranges the original document at every scan line. An image sensor circuit 160 converts the optical density of the original document into a scanned analog electrical facsimile signal. An A-D converter 170 samples the analog facsimile signal and produces a binary representation of it to provide a two-level digital representation of the facsimile signal. In the preferred embodiment, the sub-scanner section (S) 150 comprises a stepping motor and a driver (not shown). By a pulse control produced by the driver, the stepping motor feeds the original documents 140, for example, by 1/7.7 mm. The direction in which the original document 140 is fed by the sub-scan scanner section (S) 150 is called the sub-scanning direction. Assume that the sub-scanning direction coincides with the downward direction on the original document 140. After the original document 140 is arranged by the sub-scanner section (S) 150, the image sensor circuit 160 scans the original document 140 along a scan line perpendicular to the sub-scanning direction, and produces a facsimile signal. The scanning direction of the original document by the image sensor circuit is called main scanning direction or scan line direction. Let it be assumed that the main scanning direction coincides with the direction from left to right on the original document 140. By one sub-scanning and one main scanning, a belt-shaped portion of the original document 140, which is 1/7.7 mm wide, that is, corresponding to one scanning, is converted into a facsimile signal. corresponding In the effective embodiment, the A-D converter 170 samples the facsimile signal and provides it in the binary representation so that resolution in the main scanning direction may be ⅛ mm. As a result of this, one sampled signal becomes an electrical signal corresponding to a sampled point on the original document 140. The sampled point has a size of 17.7×⅛ mm, and is referred to as a picture element (pel). The pel is defined as a white pel or black pel corresponding to a selected base level. Sampled signals generated in response to scanning of pels on one scanning line are called scan data. For instance, the scan data produced corresponding to the white pel can have an electric potential of zero volt and the scan data produced corresponding to the black pel can have a positive or negative potential relative to zero. In the effective embodiment, a document having a size of JIS-A4 is scanned at the rate of 1728 pels/215 mm (sampling density : ⅛ mm). In other words, the facsimile signal of one scanning line is composed of 1728 scan data. If a linear solid state image sensor such as a charge coupled device (CCD) having 1728 elements is used as the image sensor circuit and, if a charge shift pulse and a sampling pulse are synchronized with each other, jitter by sampling is avoided to provide for enhanced picture quality. Line memories (S) 180 include line memories of plural lines. The scan data obtained by one main scanning are stored in one of the line memories (S) 180. The capacity of one line memory is equal to the amount of scan data of one scan line and has addresses 1 to 1728. For example, the value of the data stored at an address n of the line memory corresponds to the value of the scan data at an nth position on one scan line. A coder 190 reads the scan data of the line memories (S) 180, and encodes them. The line memories (S) 180 applies a feed command of one scan line to the sub-scanner section (S) 150 at proper timing while observing the time necessary for encoding of one scan line. The sub-scanner section (S) 150 again feeds the original document 140 by 1/7.7 mm, and arranges it at the next adjacent scan line position. Thereafter, the image sensor circuit 160 and the A-D converter 170 generate scan data corresponding to the new scan line. The above operations are repeated until completion of transmission of one original document. The time required for encoding and transmission of one scan line is dependent upon the information contained in the said line. That is, if the amount of information is large, the encoding and transmission take much time and if the amount of information is small, the encoding and transmission are finished in a short time. Accordingly, the line memories (S) 180 applies the feed command to the sub-scanner section (S) 150 not at equal time intervals but intermittently.

The coder section 120 converts the scan data into coded data of less data amount using the redundancy reduction coding method of this invention.

A transmission control (S) 200 is started by the control of the scanner section 110 to control a frame encoder 210 and the line memories (S) 180. The frame encoder 210 reforms control data for controlling transmission between the transmitting and receiving ends reframes encoded data by the coder into a transmission frame suitable for transmission, and applies them as transmission data to a buffer memory (S) 220. The buffer memory (S) 220 stores the transmission data produced by the frame encoder 210, and then sends the data to the transmission line 500 through a modulator 130 at a constant rate corresponding to the transmission rate.

The receiving end includes a demodulator 510, a decoder section 520 and a scanner section (R) 530. The decoder 520 receives the transmitted data through the demodulator 510, and decodes the data into the original scan data. The scanner section (R) 530 arranges a copy paper at each scan line, and records the scan data to obtain a received copy 540.

A buffer memory (R) 550 stores the transmitted data from the demodulator 510, and then a frame decoder 560 reads out the transmitted data from the buffer memory 550 to identify the control data and the coded data. The control data are decoded by the frame decoder 560, and applied through a transmission control (R) 570 to the scanner section (R) 530 to control it. A decoder 580 decodes the coded data into the scan data and writes the latter into one of line memories (R) 590. The line memories (R) 590 includes line memories of plural lines. When the scan data of one scan line has been written in the line memory, a subscanner section (R) 600 is driven to feed the copy paper by one scan line, i.e. by 1/7.7 mm. After having arranged the copy paper, a recording section 610 reads out the line memory having written therein the scan data to effect regeneration of one scan line. The scanner section (R) 530 repeats the above process every time the line memory becomes full, and reproduces a received copy 540.

The san data which have two levels, such as a facsimile signal or the like, have high correlation not only between pels along a scan line but also between pels on the adjacent scan lines. Considering each of a one-dimensional coding scheme utilizing only the correlation along a scan line, a two-dimensional simultaneous coding scheme utilizing the correlation between pels in two or more scan lines, and a two-dimensional sequential coding scheme sequentially utilizing the correlation between adjacent scan lines, the last coding scheme is the highest as to the compression rate resulting from signal redundancy reduction coding.

Of the two-dimensional sequential coding schemes, the predictive differential quantizing in patterns disclosed in the aforesaid reference literature (ii) will be described in detail with regard to FIGS. 2A to 2E and 3.

Figure 2A:
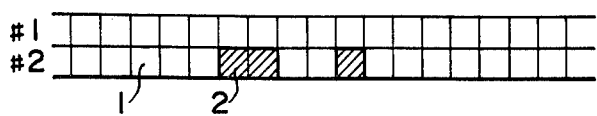
FIGS. 2A to 2E are diagrams explanatory of patterns identified in the conventional predictive differential quantizing in patterns.
Figure 2B:
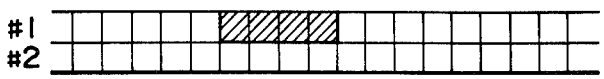
Figure 2C:
Figure 2D:
Figure 2E:
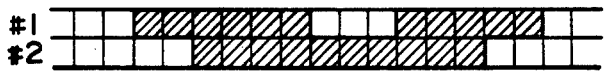

The scan line immediately preceding the scan line to be coded will hereinafter be referred to as the preceding line #1 and the scan line to be coded will hereinafter be referred to as the current line #2. Reference numerals 1 and 2 indicate pels of second and first levels, respectively. To facilitate a better understanding of the invention, the first level is assumed to be black and the second level white in the following description.

in this scheme, a first pattern such as shown in FIG. 2A in which there does not exist in the preceding line any black run which overlaps those on the current line, a second pattern such as shown in FIG. 2B in which there does not exist in the current line any black run which overlaps those on the preceding line, a third pattern such as shown in FIG. 2C in which a black run on the preceding line overlaps a black run on the current line, a fourth pattern such as shown in FIG. 2D in which one black run on the preceding line and two or more black runs on the current line overlap each other, and a fifth pattern such as shown in FIG. 2E in which only one black run on the current line and two or more black runs on the preceding line overlap each other, are respectively identified and uniquely coded for transmission.

Figure 3:
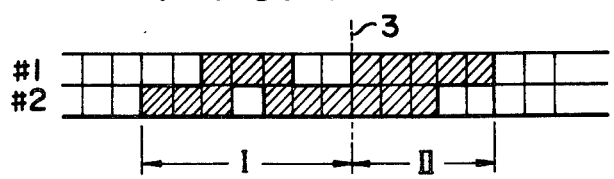
FIG. 3 is a diagram explanatory of cutting a pattern in the conventional predictive differential quantizing in patterns.

In real documents, however, there sometimes occurs a pattern which does not correspond to any of the abovesaid five patterns, as depicted in FIG. 3. With the conventional method, in such a case, the pattern is cut at the part of the broken line 3 into patterns I and II, which are coded separately of each other. Further, for pattern identification, it is necessary to scan the same pel twice or more, or to the left or right. This inevitably leads to the defects that the coder is complicated and that the processing time is long.

To avoid such defects, in the present invention, scan data on the preceding and current lines are simultaneously scanned and observed one-directionally in the main scanning direction and the edge states between white and black pels present on both scan lines are coded. The position where the edge crosses the scan line is the same as the transition point where the pel level transmits from white to black or vice versa. In other words, in the coding scheme of this invention, the state of the relative position of two transition points which successively occur on the same edge is coded. The edge states on the preceding and current lines or the pair of two transition points, which successively occur in the scan line, are classified into the following three kinds:

With regard to exemplary scan data shown in FIG. 4, the three kinds of edge states will be described.

First state ($E_1$) ... The state in which the edge on the preceding line continues to the current line, that is, the state in which each of two transition points successively occurring along the scan line exists on the preceding and the current line (refer to $E_1$ in FIG. 4).

Second state ($E_2$) ... The state in which the edge on the preceding line turns up on the same scan line, that is, the state in which two transition points successively occurring along the scan line exist only on the preceding line (refer to $E_2$ in FIG. 4).

Third state ($E_3$) ... The state in which the edge on the current line turns down on the same scan line, that is, the state in which two transition points successively occurring along the scan line exist only on the current line (refer to $E_3$ in FIG. 4).

In the main scanning direction, the states are sequentially identified one-directionally and, when any one of the abovesaid three states is identified, the state is coded at that moment. Thereafter, the identification and coding of the next states take place in succession and, when coding of the current line is completed, the current line is regarded as the preceding line and the scan line immediately after the current line is newly read out as the current line and then coding of this current line is started.

Figure 4:
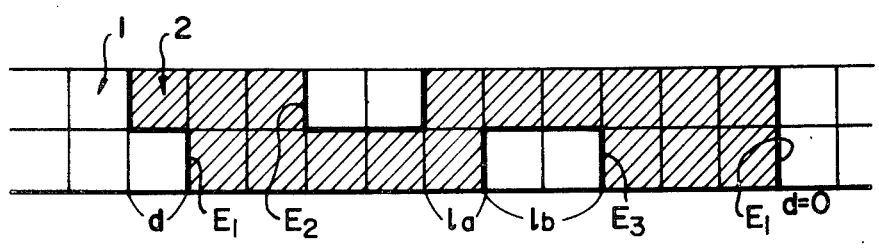
FIG. 4 is a diagram explanatory of three kinds of edge states and their coding according to this invention.

The states in FIG. 4 are coded in the following manners:

First state ... The difference (d) in the edge position between adjacent scan lines, that is, the relative position of the two transition points, is coded. The difference (d) may be plus, zero or minus. This difference (d) will hereinafter be referred to as the edge difference (d). The two First states in FIG. 4 are coded into $S_1 \cdot D(+1)$ and $S_1 \cdot D(O)$, respectively. $S_1$, $S_2$ and $S_3$ are state codes respectively corresponding to the states $E_1$, $E_2$ and $E_3$, and D(d) is a difference code.

Second state ... This state is coded only with a state code indicative of the Second state. That is, since the preceding line has already been coded, it is sufficient only to indicate that there is no new transition point in the corresponding part of the current line. In FIG. 4, the Second state is coded into $S_2$.

Third state ... A state code indicative of the Third state, the distance (la) between the second transition point on the right of the immediately preceding state and the lefthand first transition point in the Third state, and the distance (lb) between the first and second transition points in the Third state are coded in the same manner as the conventional run-length coding. That is, in FIG. 4, the Third state is coded into $S_3 \cdot L(1) \cdot L(2)$, where L(l) is a run length code. Thus, the scan data of the current line shown in FIG. 4 are coded as follows:

$$S_1 \cdot D(+1) \cdot S_2 \cdot S_3 \cdot L(1) \cdot L(2) \cdot S_1 \cdot D(O)$$

To simplify the algorithm for coding, such initial conditions as shown in FIGS. 5, 6A and 6B are set up.

In the case of coding a first line of an original document (a first scan line No. 1), one method is to effect coding on the assumption that an all white pels line, i.e. an idle line, exists as a scan line No. 0 immediately before the first line No. 1, as shown in FIG. 5. Alternatively, only the first line is subjected to one-dimensional run-length coding which enables coding without using information of the preceding line.

Further, for simplifying the state identifying algorithm, a first pel of the scan data of each scan line is set to be a white pel, as shown in FIG. 6B. That is, when all the pels of the line are black pels as shown in FIG. 6A, no edge exists, so that coding is difficult. If the first pel of each scan line is white as depicted in FIG. 6B, the First state can be identified and the algorithm becomes simple. Moreover, decoding is also easy. And such process does not degrade the picture quality.

In an actual facsimile signal, two edges cross each other in some cases, as illustrated in FIG. 7. Namely, in the case of identifying the pair of transition points, there are some occasion when the first and second transition points occur simultaneously at the same position on the preceding and the current lines, respectively. In anticipation of this, identification priority of the First, Second and Third states $E_1$, $E_2$ and $E_3$ is predetermined as shown in FIG. 7. With this scheme, any scan data can be uniquely coded and decoded without inconsistency. The priority may be determined in four ways, as indicated by A, B, C and D in FIG. 7. With the method C, the value of a first run length ($l_1$) of the Third state does not become zero and, the algorithm used is simplified, and implementation is also a little simplified. In terms of the redundancy reduction effect, the respective methods A, B, C and D are substantially equal to one another but the method A is a more desirable.

Further, where the preceding line #1 and the current line $\pi 2$ are both idle lines as shown in FIG. 8, no edge state is identified on both the lines. In such a case, the code $S_1 \cdot D(0)$ of the First state, indicating that the value of the difference (d) is zero, is transmitted. In the decoder, if the First state, in which the difference equal to zero is detected immediately after the preceding line #1, is decoded as an idle line, the current line #2 is also decoded as an idle line.

Moreover, since the edge difference coding scheme of this invention makes use of correlation between scan lines, a code error has a wide-spread influence in impairing the picture quality of a received copy. Accordingly, in the case of applying the method of this invention to the system in which a code error exists, coding which does not make use of correlation between scan lines, for instance, the one-dimensional run-length coding, proposed by Wyle et al (Wyle et al, "Reduced-Time Facsimile Transmission," IRE Trans., CS-9, 3 (1961)), is achieved every K (=2, 3, 4, ...) scan lines as illustrated in FIG. 9, thereby preventing the code error propagating through more than K-1 subsequent scan lines. FIG. 9 shows the case K = 4.

Further, for error detection and recovery, first and second control codes SYNC1 and SYNC2 are inserted in a code sequence. That is, as depicted in FIG. 10, the first control code SYNC1 is inserted in the head of the code sequence EDIC of the scan line to be coded according to the present invention, and the second control code SYNC2 is inserted in the head of the code sequence RL of the scan line to be coded according to the one-dimensional run-length coding.

Decoding the codes intermediate between the control codes, the pels of one scan line are reproduced. In this case, if the number of pels is larger or smaller than a predetermined number, a code error is assumed to exist and the scan line information is replaced with information of the preceding line, or decoding is stopped until the second control code is detected and the coded data in this interval are cancelled. In the preferred embodiment of the facsimile system, since one scan line is 1/7.7 mm wide, even if it is replaced with the preceding line, impairment of the picture quality is not so much noticeable. Then, by detecting the second control code SYNC2 and reproducing the scan line subjected to the run-length coding, the coder recovers from the state suffering an error influence.

It is also possible to employ such a method which retransmits the portion in which the code error is detected, but in the case of facsimile, the transmission efficiency is lowered, so that this method is not widely used.

Table 1 shows an effective embodiment of rules for easily identifying the states $E_1$, $E_2$ and $E_3$ from the mode transitions. The mode herein mentioned is intended to mean the scan data on the preceding line and the current line, which are a pair of pels existing at the same address. The mode can have a desired value of the following four possible states:

Mode $M_0$ : a pair that pels on the both lines are white.
Mode $M_1$ : a pair that the pel on the preceding line is white and that the pel on the current line is black.
Mode $M_2$ : a pair that the pel on the preceding line is black and that the pel on the current line is white.
Mode $M_3$ : a pair that the pels on the both lines are black.

In the coding sheme of this invention, by detecting the mode transitions twice at most, the abovesaid three kinds of edge states and, in the case of the First state, the polarity of edge difference can be identified. The mode at the moment when the edge states are identified will hereinafter be designated by Mc, and the preceding mode of the mode Mc will be designated and the mode just before transiting to the mode Mb will be designated by Ma. The end of the scan data is indicated by LE. Table 1 shows the case where the state identifying priority is C in FIG. 7. No. 1 in Table 1 shows that in the case of mode transition $M_0 \cdot M_1 \cdot M_0$, the Third state $E_3$ is identified. No. 13' shows that in the case of mode transition $M_2 \cdot M_1 \cdot M_0$, the First state $E_1$ is identified and that the polarity of the edge difference is positive. No. 9 and No. 9' show that the First state $E_1$ is identified by only one mode transition and that the edge difference is zero. In Table 1, No. n and No. n' complement each other in the sense that if the pel levels of one mode n are inverted, it becomes the same as another mode n'. Table 1 shows all possible mode transitions in the case where the mode identification priority is $E_3 > E_1 > E_2$.

Table 1

| No. | MODE TRANSITION Ma → Mb → Mc | | | IDENTIFIED STATE | EDGE DIFFERENCE PORARITY |
|---|---|---|---|---|---|
| 1 | $M_0$ | $M_1$ | $M_0$ | $E_3$ | |
| 2 | $M_0$ | $M_1$ | $M_2$ | $E_3$ | |
| 3 | $M_0$ | $M_1$ | $M_3$ | $E_1$ | MINUS |
| 4 | $M_0$ | $M_1$ | LE | $E_3$ | |
| 5 | $M_0$ | $M_2$ | $M_0$ | $E_2$ | |
| 6 | $M_0$ | $M_2$ | $M_1$ | $E_1$ | PLUS |
| 7 | $M_0$ | $M_2$ | $M_3$ | $E_1$ | PLUS |
| 8 | $M_0$ | $M_2$ | LE | $E_2$ | |
| 9 | — | $M_0$ | $M_3$ | $E_1$ | ZERO |
| 10 | — | $M_0$ | LE | — | |
| 11 | $M_1$ | $M_2$ | $M_0$ | $E_2$ | |
| 12 | $M_1$ | $M_2$ | $M_1$ | $E_1$ | PLUS |
| 13 | $M_1$ | $M_2$ | $M_3$ | $E_1$ | PLUS |
| 14 | $M_1$ | $M_2$ | LE | $E_2$ | |
| 1' | $M_3$ | $M_2$ | $M_3$ | $E_3$ | |
| 2' | $M_3$ | $M_2$ | $M_1$ | $E_3$ | |
| 3' | $M_3$ | $M_2$ | $M_0$ | $E_1$ | MINUS |
| 4' | $M_3$ | $M_2$ | LE | $E_3$ | |
| 5' | $M_3$ | $M_1$ | $M_3$ | $E_2$ | |
| 6' | $M_3$ | $M_1$ | $M_2$ | $E_1$ | PLUS |
| 7' | $M_3$ | $M_1$ | $M_0$ | $E_1$ | PLUS |
| 8' | $M_3$ | $M_1$ | LE | $E_2$ | |
| 9' | — | $M_3$ | $M_0$ | $E_1$ | ZERO |
| 10' | — | $M_3$ | LE | — | |
| 11' | $M_2$ | $M_1$ | $M_3$ | $E_2$ | |
| 12' | $M_2$ | $M_1$ | $M_2$ | $E_1$ | PLUS |
| 13' | $M_2$ | $M_1$ | $M_0$ | $E_1$ | PLUS |
| 14' | $M_2$ | $M_1$ | LE | $E_2$ | |

FIG. 11 illustrates an example of one part of exemplary scan data, in which #1 is the preceding line and #2 the current line. Reference numeral 4 indicates the main-scanning direction. In the present example, the document is scanned from the left side to right side and it is evident that generality is not lost by such scanning. The state identifying priority in the case of the edges crossing each other may be set in accordance with the methods A, B, C and D shown in FIG. 7 but, for the sake of simplicity, in the following examples, the method C is employed. Accordingly, the respective states can be identified in accordance with the state identifying rule shown in Table 1. With reference to FIG. 11, state identification and a coding method will be described in detail. Pi ($i = 1, 2, 3, \ldots$) indicates the pel location or address on a scan line. As the mode transition is progressively detected in the main scanning direction from the address $P_1$ in FIG. 11, the mode $M_0$ transits to the mode $M_1$ at the address $P_2$ and returns to the mode $M_0$ at the address $P_3$. The run length of the mode $M_0$ is $l_1$ (=3) and the run length of the mode $M_1$ is $l_2$ (=2). That is, mode transitions between the addresses $P_1$ and $P_3$ is $M_0(l_1) \rightarrow M_1(l_2) \rightarrow M_0$. The values in the brackets indicate the run lengths of the respective modes. It is seen that this is the case of No. 1 in Table 1 and the Third state in which the edge $b_1$ on the current line turns down to the edge $b_2$. The Third state is represented by the state code and a pair of the RL code of the first mode $M_0$ (or $M_3$) and the RL code of the second mode $M_1$ (or $M_2$). The segment from $P_1$ to $P_3$ in FIG. 11 is encoded into $S_3 \cdot L(3) \cdot L(2)$, where $S_3$ is the Third state code and $L(l)$ is a code indicative of the run length of the length l. Next, as the detection of mode transition proceeds from the address $P_3$ and the mode run length is counted, the mode $M_0$ transits to mode $M_2$ at the address $P_4$ and $M_1$ at $P_5$, and mode transitions between the addresses $P_3$ and $P_5$ are $M_0(2) \rightarrow M_2(3) \rightarrow M_1$. Accordingly, it is seen that this state is the case of No. 6 in Table 1 and the First state in which the edge $b_3$ on the preceding line continues to the edge $b_4$ on the current line. In the First state, the difference between the positions of edges $b_3$ and $b_4$ is encoded. The abovesaid difference is equivalent to the relative distance between two successive transition points $P_4$ and $P_5$. In this case, the difference $d_1$ is such that $d_1 = P_5 - P_4 (= +3)$ and this segment is encoded into $S_1 \cdot D(+3)$, where $S_1$ is the First state code and $D(d)$ the difference code. Where a mode transition is $M_2 \rightarrow M_1$ or $M_1 \rightarrow M_2$, edges cross each other and the initial mode of the detection of mode transition for the next state identification is set to be the mode of the preceding address $P_5'$ of the address $P_5$ where the edge has just been identified. The mode at the address $P_5'$ is $M_2$, which transits to $M_1$ at the address $P_5$ and to $M_0$ at $P_6$, so that mode transitions between the addresses $P_5'$ and $P_6$ are $M_2 \rightarrow M_1(1) \rightarrow M_0$. Accordingly, this state corresponds to the case of No. 13' in Table 1 and this segment is encoded into $S_1 \cdot D(+1)$.

It is seen that mode transitions $M_0(1) \rightarrow M_2(1) \rightarrow M_3$ take place in segment between the address $P_6$ and those $P_7$ and $P_8$. This state corresponds to the case of No. 7 in Table 1, and is encoded into $S_1 \cdot D(+1)$.

Further, it is seen that a mode transition $M_3(3) \rightarrow M_0$ exists from the address $P_8$ to $P_9$. This segment corresponds to the special case of the First state as indicated by No. 9' in Table 1 and the difference between the position of the edge $b_9$ on the preceding line and that of the edge $b_{10}$ on the current line is zero. This segment is encoded into $S_1 \cdot D(0)$.

Next, mode transitions $M_0(2) \rightarrow M_1(1) \rightarrow M_3$ take place in the segment from the address $P_9$ to those $P_{10}$ and $P_{11}$, and this segment corresponds to the case of No. 3 in Table 1 and encoded into $S_1 \cdot D(-1)$.

In the segment from the address $P_{11}$ to $P_{12}$ and $P_{13}$, there are mode transitions $M_3(2) \rightarrow M_2(2) \rightarrow M_3$ and it is seen from No. 1' in Table 1 that this segment is in the Third state. The first and second mode run-lengths in this case are $l_3 (=2)$ and $l_4 (=2)$, and this state is encoded into $S_3 \cdot L(2) \cdot L(2)$.

In the segment from the address $P_{13}$ to $P_{14}$ and $P_{15}$, mode transitions $M_3(2) \rightarrow M_1(1) \rightarrow M_3$ occur and it is seen from No. 5' in Table 1 that this segment is in the Second state. This state is encoded into $S_2$.

In the segment from the address $P_{15}$ to $P_{16}$ and $P_{17}$, mode transitions $M_3(2) \rightarrow M_2(2) \rightarrow M_3$ occur and it is seen from No. 1' in Table 1 that this segment is in the Third state. In this case, the first and second mode run-lengths are $l_5 (=2)$ and $l_6 (=2)$ and this state is encoded into $S_3 \cdot L(2) \cdot L(2)$.

In the segment from the address $P_{17}$ to $P_{18}$ and $P_{19}$, mode transitions $M_3(3) \rightarrow M_2(3) \rightarrow M_0$ occurs and it is seen from No. 3' in Table 1 that this segment is in the First state of the difference $d_6 (=3)$. This state is encoded into $S_1 \cdot D(-3)$.

Thereafter, in the segment from the address $P_{19}$ to an address $P_{20}$ which is fictitiously provided immediately after the last pel of the line, the mode transition $M_0 \rightarrow LE$ occurs and it is seen from No. 10 in Table 1 that there is no new edge state. Thus, encoding of the current line is completed. Then, similar encoding is sequentially repeated, regarding the scan data of the current line as those of the preceding line and a new scan data as those of the current line.

Next, a brief description will be given of a decoding method. The preceding line is already decoded. At first, the state code is detected from the received coded data. When the Third state code is detected, the first and second RL codes following it are decoded to reconstruct pels on the current line. After completion of the pel reconstruction of the Third state, detection of a new state code takes places.

Next, where the First state code is detected, detection of a transition point on the preceding line starts along a scan line and after detection of a first transition point, the difference d from the coded data is decoded to reconstruct pels on the current line. Thereafter, detection of a new state code takes place.

When the Second state code is detected, detection of transition points on the preceding line starts along a scan line and, at the moment of detection of a second transition point, the detection of a new transition point is stopped and pels on the current line are reconstructed. Then, detection of a new state code starts.

Where the preceding line is an idle line and the code $S_1 \cdot D(0)$ is detected, the current line is also decoded as an idle line.

Table 2 shows effective embodiments of digital outputs of state codes $S_1$, $S_2$ and $S_3$ respectively indicative of signals identifying the First, Second and Third states and, in this table, the code length of the First state code of statistically large occurrence probability is shown to be the shortest.

Table 2

| EDGE STATES | FUNCTION | CODE |
|---|---|---|
| First state | $S_1$ | 1 |
| Second state | $S_2$ | 01 |
| Third state | $S_3$ | 00 |

The difference d is plus, minus or zero. Then, except in the case of D(0), the difference is expressed as follows:

$$D(d) = S(\pm) D_A(|d|)$$

where $S(\pm)$ is a polarity code indicative of plus or minus and $D_A(|d|)$ is a code indicative of the absolute value of the difference d.

Effective embodiments of digital outputs of codes for D(0) and $S(\pm)$, respectively indicative of the difference being zero, and the polarity of the difference not being zero are shown in Table 3. Statistically, the value of the difference d is concentrated on the vicinity of zero, and is zero in most cases, so that a shortest-length code is assigned to D(0).

Table 3

| FUNCTION | CODE |
|---|---|
| D(0) | 1 |
| S(+) | 01 |
| S(−) | 00 |

Effective embodiments of digital outputs of the code L(l) indicative of the length l and the code $D_A(|d|)$ indicative of the absolute value $|d|$ are shown in Tables 4 and 5, respectively.

Table 4

| l | L(l) |
|---|---|
| 1–4 | 1** |
| 5–8 | 01** |
| 9–16 | 001*** |
| ...... | |
| 1025–2048 | 0000000001********** |

Table 5

| d | $D_A(|d|)$ |
|---|---|
| n | n − 1 |
| | 000 . . . . . 0 1 |

Table 6

| FUNCTION | CODE |
|---|---|
| D(0) | 1 |
| S(+) | 010 |
| S(−) | 011 |
| S(2) | 001 |
| S(3) | 000 |

There is a second embodiment which performs the following more efficient encoding instead of the above encoding method employing $S_1 \cdot D(0)$ or $S_1 \cdot S(\pm) \cdot D_A(|d|)$ ($|d| \neq 0$) in the case where the frequency of occurrence of the difference $d=0$ in the First state is higher. That is, this method uses a state $E_0$ which is encoded into D(0) instead of $S_1 \cdot D(0)$ and state $E_+$ or $E_-$ which is encoded into $S(\pm)D_A(|d|)$ instead of $S_1 \cdot S(\pm)D_A(|d|)$. In this embodiment, the First state code is not used but instead code assignment is effected so that the codes D(O) and $S(\pm)$ include a signal identifying the First state and may be distinguished from the Second and Third state codes $S_2$ and $S_3$. Effective embodiments of definite code assignment are shown in Table 6. In this second embodiment, the code length in the case of the difference d being zero is one bit, and shorter than in the first embodiment by one bit. But instead, the code lengths for the Second state and the Third state are respectively larger than those in the first embodiment by one bit. The second embodiment is effective when the occurrence probability of the difference $d=0$ is 50% or more.

Statistically, the number of states for which the value of the difference (d) is zero in the First state in connection with various documents is about 50%. That is, the edge is generally smooth and the correlation of the transition points on the edge is high. In the second embodiment, since the smooth state is encoded with only one bit, efficient encoding is realized in accordance with statistics and it is possible to obtain a compression ratio which is remarkably high in the redundancy reduction effect.

Figure 13:
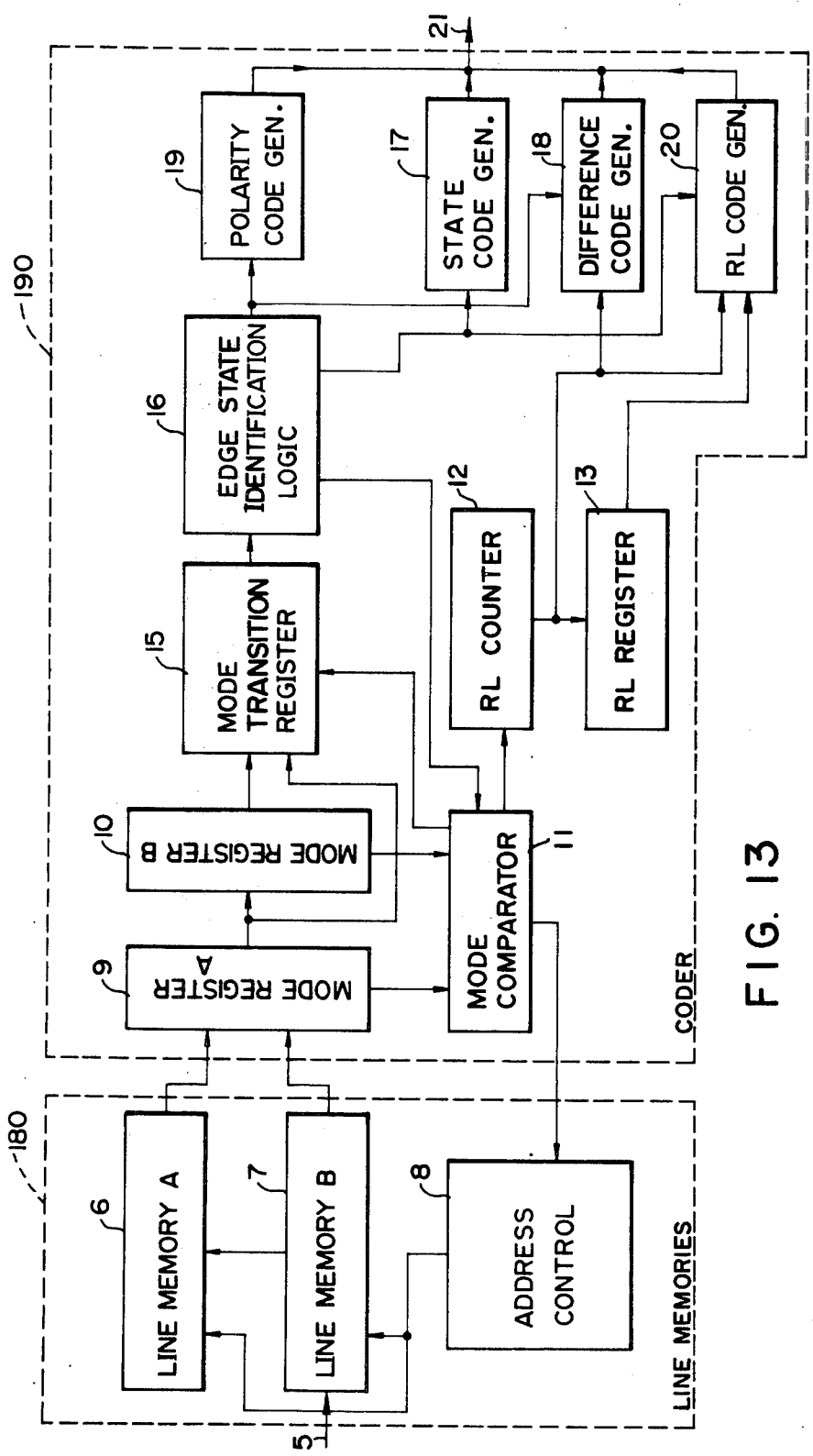
FIG. 13 is a block diagram of a coder illustrating an embodiment of this invention.

FIG. 13 is a block diagram illustrating an embodiment of the line memories 180 (FIG.) and the coder 190 in this invention. In FIG. 13, reference numeral 5 indicates a two-level scan data input line; 6 designates a line memory A for storing scan data of the preceding line; 7 identifies a line memory B for storing scan data of the current line; 8 denote an address control for controlling write and read of the line memories A and B; 9 represents a mode register A for storing a mode composed of a pair of scan data made up of scan data of a desired address of the line memory A and scan data of the same address of the line memory B; 10 shows a mode register B for storing the mode of the address immediately preceding the mode stored in the mode register A; 11 refers to a mode comparator for comparing the content of the mode register A with that of the mode register B to detect a mode transition; 12 indicates an RL counter for counting the length of the same mode while it continues; 13 designates an RL register for storing the result of RL counting; 15 identifies a mode transition register for providing a history of two mode transitions at most; and 16 denotes an edge state identification logic for identifying the edge state based on the output from the mode transition register. The respective blocks are shown to be interconnected through one or more lines. This indicates the direction of data or control signal and, needless to say, the lines used do not correspond in number to those practically employed for intercounnecting parts of the respective blocks.

Upon completion of coding of one scan line, the stored data of the line memory B are shifted to the line memory A. Then, new scan data of one scan line are stored in the line memory B through the line 5 from a facsimile equipment. In this case, it is also possible to switch the input to the line memory A to store therein the new scan data. The address control 8 progressively and simultaneously reads the scan data of the same addresses of the line memories A and B in the main-scanning direction, and applies the scan data to the mode register A. Immediately before it, the stored data of the mode register A are shifted to the mode register B. When no mode transition exists, the mode comparator 11 drives the RL counter 12 and, at the same time, drives the address control 8 to read out a new mode. When a first mode transition is detected, and if any edge state is not identified, the resultant data of the RL counter is transferred to the RL register and the RL counter is reset.

At this moment, if the edge state identification logic 16 identifies the First state of the edge difference (d) as being zero, the function of the address control 8 is stopped and a polarity code generator 19 is controlled to generate a code corresponding to the function D(O).

Where the edge state is not identified by the edge state identification logic 16 at the moment of detection of a first mode transition, the address control 8 increments the address progressively in the main-scanning direction to sequentially read out the mode so as to detect a second mode transition, and the RL counter counts the continuation length of the same mode. Upon detection of the second mode transition, the address control is stopped and the edge state identification logic 16 identifies the edge state from the state of the two previous mode transitions. On the other hand, the resultant data of the RL counter 12 is still being stored.

In the case of the First state, the polarity code generator 19 generates a digital output corresponding to the function S(+) or S(−) and the difference code generator 18 sequentially generates a digital output corresponding to the function $D_A(|d|)$ by reading out the resultant data of the RL counter 12.

In the case of the Third state, a state code generator 17 generates a digital output corresponding to the function $S_3$ and the contents of the RL register 13 and the RL counter 12 are sequentially read out by a RL code generator 20 to generate digital outputs corresponding to two RL codes.

In the case of the Second state, the state code generator 17 generates only a digital output corresponding to the function $S_2$.

Upon completion of coding of one edge state, the RL counter 12 is cleared and the address control 8 is driven again to start new edge state detection.

Upon completion of processing of data in the last addresses of the line memories A and B, the scan data of the line memory B are transferred to the line memory A and scan data of a new scan line are written in the line memory B.

Figure 14:
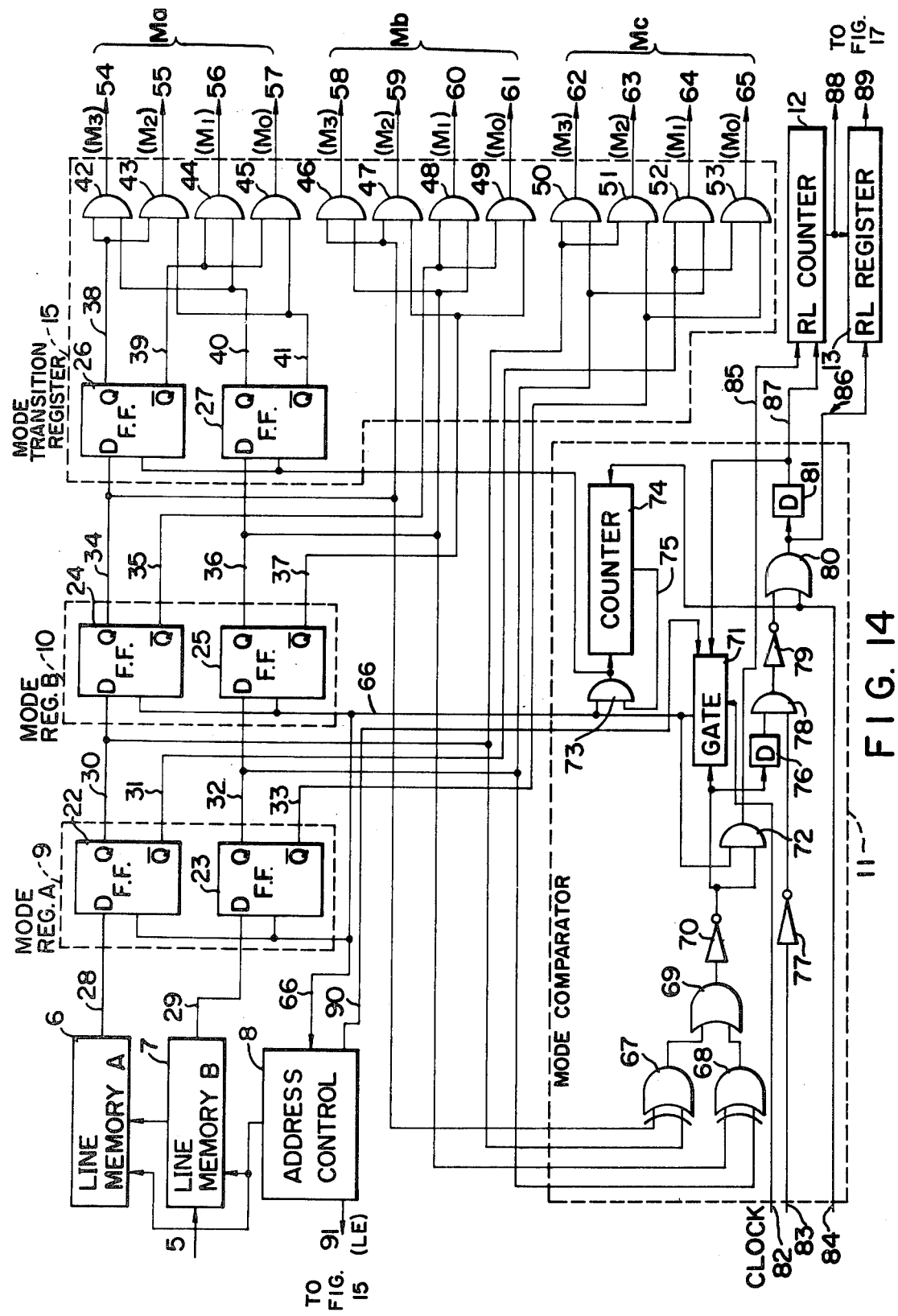
FIG. 14 illustrates, in detail, mode registers A and B, a mode comparator, and a mode transition register used in FIG. 13.
Figure 15:
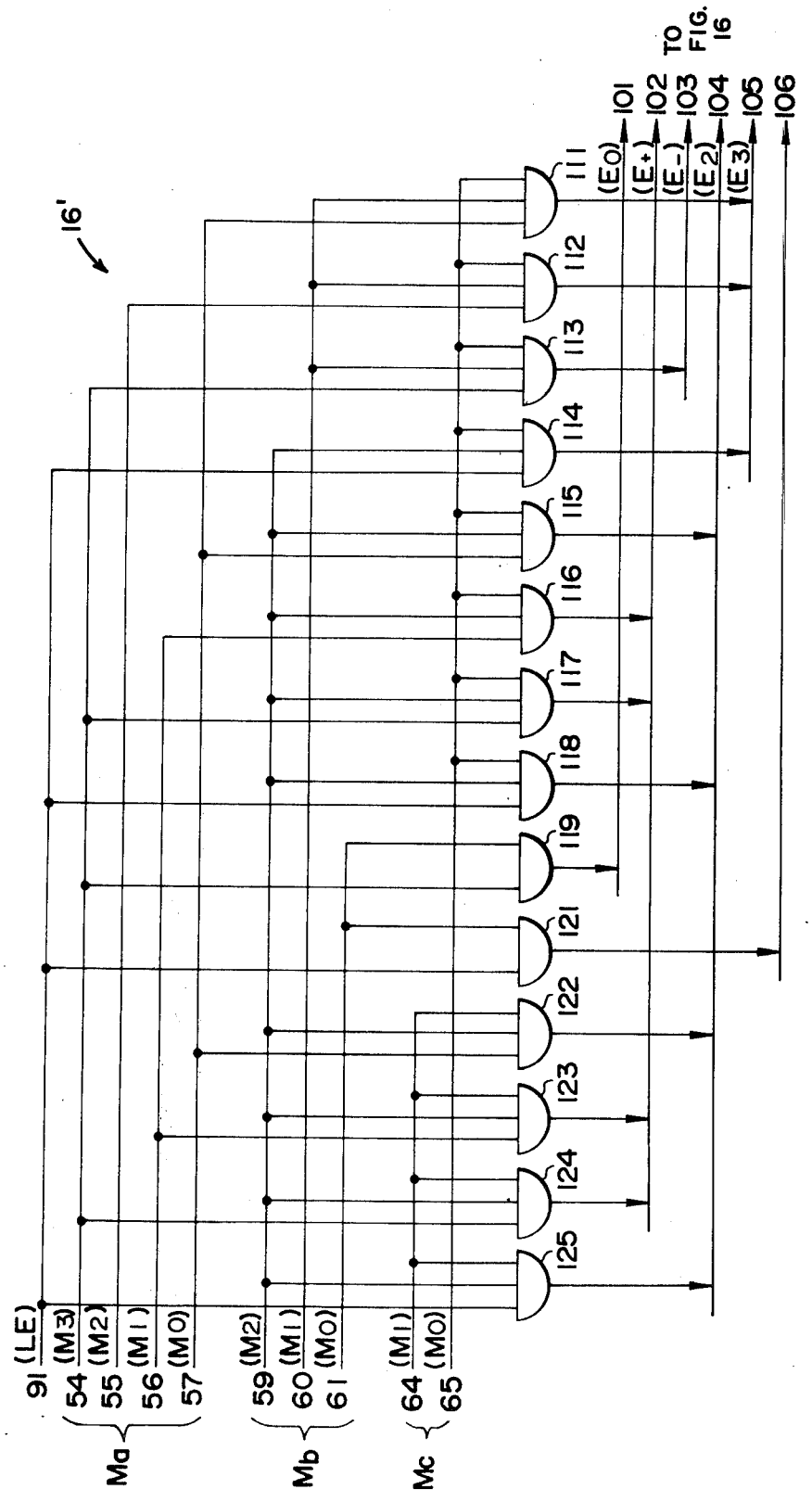
FIGS. 15 and 16 show detailed connection diagrams of an edge state identifier.
Figure 16:
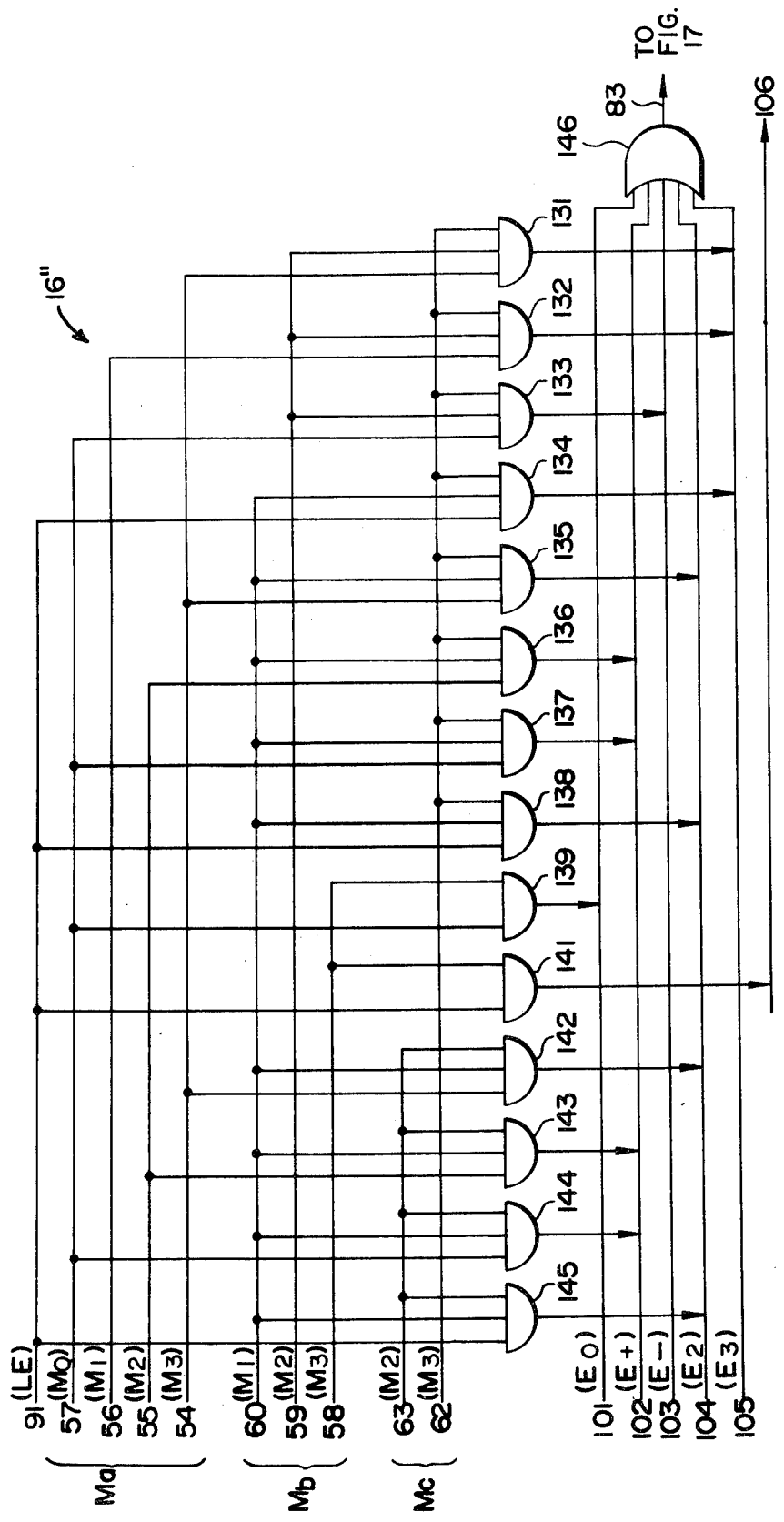
Figure 17:
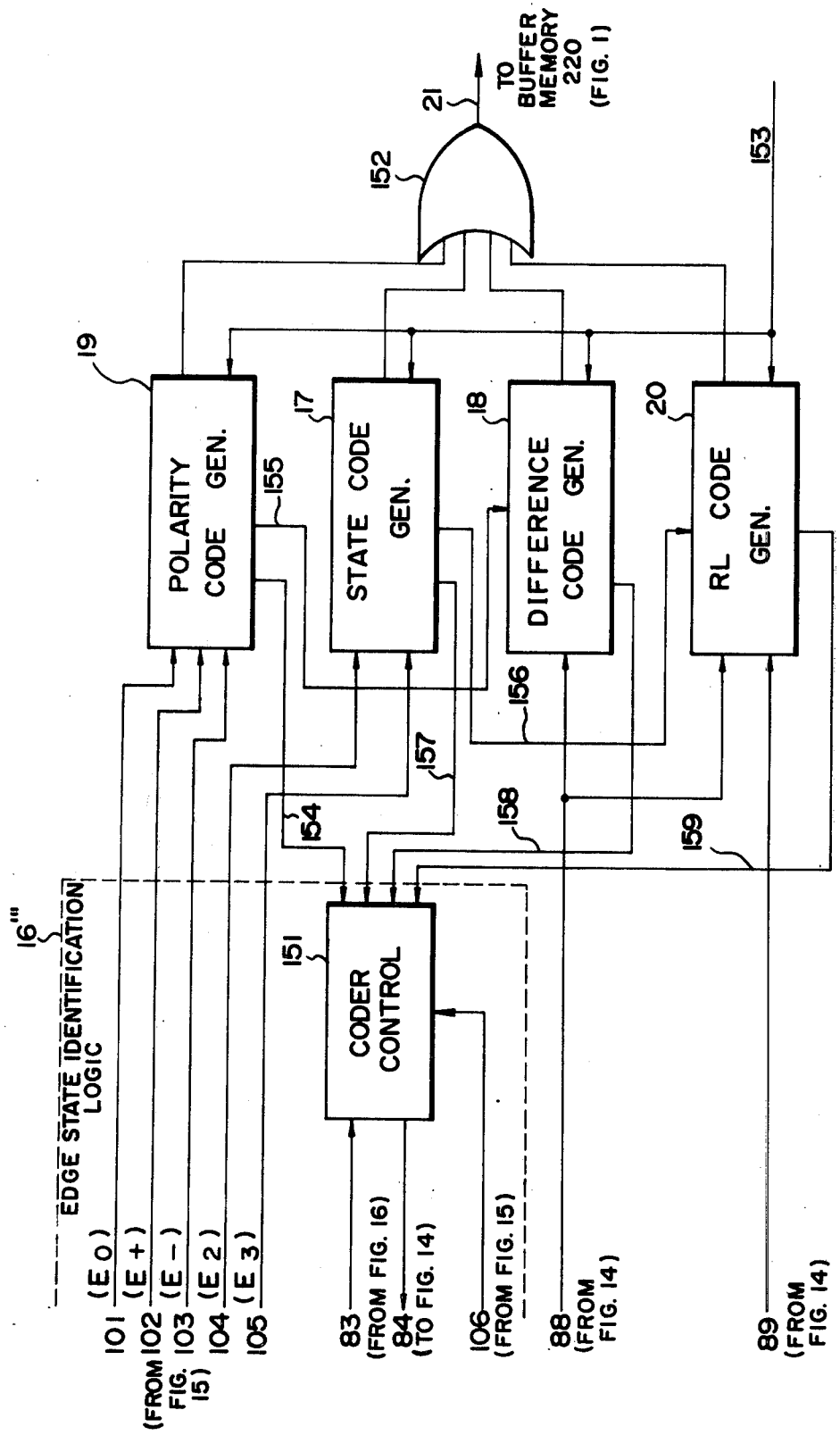
FIG. 17 is a block diagram illustrating a circuit for generating each code.

In FIG. 14, there is illustrated, in detail, preferred embodiments of the mode register A 9, the mode register B 10, the mode comparator 11, and the mode transition register 15, while in FIGS. 15-17 there is illustrated, in detail, a preferred embodiment of the edge state identification logic 16 (portions 16', 16" and 16''', respectively) which are inherent to this invention.

FIG. 14 includes logical circuits of the mode register A 9, the mode register B 10, the mode comparator 11, and the mode transition register 15. The mode register A 9, the mode register B 10 and the mode transition register 15 each comprise two D-type flip-flops 22 to 27. Upon application of a clock pulse to the D-type flip-flop, data of the input D are shifted to the output Q. At the output Q, inverted data of the output Q are provided. The D-type flip-flop operates as a shift register. The D-type flip-flop 22 is supplied with the output 28 from the line memory A 6 and the D-type flip-flop 23 is supplied with the output 29 from the line memory B 7. Since a common clock pulse line 66 is connected to the D-type flip-flops 22 to 25, data on lines 28 and 29 are shifted to lines 30 and 32 by a pulse applied via the line 66 and data on the lines 30 and 32 are respectively shifted to lines 34 and 36. The address control 8 simultaneously increments the addresses of the line memories A 6 and B 7 by one address by a pulse generated on the line 66. Accordingly, there are provided on the lines 28 and 29 a pair of data from corresponding addresses of the line memories A and B, scan data of the preceding line and the current line. That is, the pair of data on the lines 28 and 29 indicates the mode described previously. Similarly, data pair on the lines 30 and 32 indicates the mode Mc immediately preceding the mode on the lines 28 and 29, and a data pair on lines 34 and 36 indicates the mode Mb immediately preceding the mode Mc. A data pair on lines 38 and 40 indicates the first mode Ma in the case where there is a need for detecting two mode transitions, as described later. For the sake of simplicity, let it be assumed that the positive levels of the line memory outputs 28 and 29 are indicative of the black level and that the zero levels are indicative of the white level. The output Q of each D-type flip-flop become positive in the case of the black level and the output Q becomes positive in the case of the white level.

The lines 30 to 41 are connected to AND gates 42 to 53. The AND gate provides a positive output only when all the inputs thereto have positive levels. A line 62 becomes positive level only when the lines 30 and 32 both have the positive level, that is, the mode Mc is the mode $M_3$. Likewise, lines 54 and 58 also become positive level when the modes Ma and Mb are the mode $M_3$. Similarly, lines 55, 59 and 63 become positive level when the mode corresponding thereto is $M_2$; lines 56, 60 and 64 become positive level when the mode corresponding thereto is $M_1$; and lines 57, 61 and 65 become positive level when the mode corresponding thereto is $M_0$. The lines 54 to 57 represent a mode state corresponding to the mode Ma; the lines 58 to 61 a mode state corresponding to the mode Mb; and the lines 62 to 65 a mode state corresponding to the mode Mc.

When scan data of the current line are written in the line memory B 7 to provide a coding enable state, the address control 8 opens a gate 71 via a line 90 to provide clock pulses on the line 82 to the line 66. Immediately before coding of each line is started, the D-type flip-flops 22 to 27 are all cleared. That is, in the initial state, the modes Ma, Mb and Mc are the mode $M_O$. Further, in the initial state, the data of the first address of each line memory is assumed to be data representative of a white pel, so that the address control indicates an address 2 and data of the address 2 are provided on the lines 28 and 29. Every time one clock pulse appears on the line 66, the mode registers 9 and 10 shift the mode. The outputs 30, 32, 34 and 36 of the mode registers 9 and 10 are also connected to exclusive OR (EX-OR) gates 67 and 68. The EX-OR gate produces a positive level only when two input levels are not the same. Upon generation of a transition point on the scan data in the line memory A 6, the output from the EX-OR gate 67 becomes positive level from zero level and, upon generation of a transition point on the scan date in the line memory B 7, the output from the EX-OR gate 68 becomes positive level. The outputs of the EX-OR gates 67 and 68 are connected to an OR gate 69. The OR gate produces an output of positive level when any one of its inputs becomes of the positive level. Where the content Mc of the mode register A 9 and the content Mb of the mode register B 10 are different from each other, the output from the OR gate 69 becomes positive level from zero level. This indicates the detection of a mode transition. Upon detection of the mode transition, the level of the output from the OR gate 69 is inverted by an inverter 70 to close the gate 71, inhibiting the application of clock pulses generated on the line 82 to the line 66. On the other hand, when no mode transition is detected, the output from the OR gate 69 is of zero level and clock pulses generated on the line 82 also pass through an AND gate 72 to count up the RL counter 12, counting the number of abovesaid clock pulses until the mode transition is generated, that is, counting the mode R1. The AND gate produces a positive level only when all input levels are positive. A line 83 becomes of the positive level when the state is identified by the edge state identification logic 16, as described later, and an AND gate 78 is closed through an inverter 77 to inhibit the application of the output from a delay 76 to an inverter 79. Accordingly, even if a mode transition is detected, when the state is not identified, a change in the output of the OR gate 69 from the zero level to positive level appears in a line 86 through the inverter 70, the delay 76, the AND gate 78, an inverter 79, and OR gate 80, loading the content of the RL counter 12 in the RL register 13. In the preferred embodiment, the RL counter 13 has such a capacity as to be capable of counting to 1728 at maximum, and has a binary output of 12 bits, and the output from the RL counter is shifted in parallel to the RL register 13 by pulses on the line 86. The pulse on the line 86 appear in a line 87 through a delay 80 to reset the RL counter 12 and to open a gate 71. Upon opening the gate 71, the clock pulses generated on the line 82 appear again on the line 66 to read out the scan data from the lines memories 6 and 7, detecting the existence of mode transitions. The clock pulses on the line 66 are applied through an AND gate 73 to a counter 74 and the D-type flip-flops 26 and 27. The counter 74 is a binary counter which, when it has counted two clock pulses from the AND gate 73, produces an output of zero level in the line 75, inhibiting the passage of the clock pulse on the line 66 through the AND gate 73. When encoding of a state has been completed, the edge state identification logic 16 gives a pulse to a line 84 to reset the counter 74 and shift the content of the R1 register 12 to the RL register 13, resetting the RL register 12. The number of clock pulses passing through the AND gate 73 after completion of encoding of one state is two at most. With these two clock pulses the contents of the D-type flip-flops 22 and 23 are shifted to the D-type flip-flops 26 and 27. That is, the state of mode Mc is exchanged with the state of mode Ma. Immediately after resetting the counter 74 the third clock pulse and subsequent clock pulses which are derived from the gate 71 no longer pass through the AND gate 73, and the data of the D-type flip-flops 26 and 27 are held until the counter 74 is reset to start a new state identification.

The edge state identification logic 16 includes a logical circuit 16' and 16" (FIGS. 15-16) for identifying an edge state and in portion 16''' (FIG. 17), a coder control 151. The inputs to the circuits of FIGS. 15 and 16 are applied from the AND gates 42 to 53 included in the mode transition register 15 (FIG. 14) and from an output line 91 of the address control 8. The group of output lines 54 to 57 of the AND gates 42 to 45 represents the state of the abovesaid mode Ma, and only one of the four lines has the positive level and the others zero level. For example, if a signal of the line 54 is of the positive level, the state corresponding to the mode Ma is the mode $M_3$. In exactly the same manner, the group of lines 58 to 61 represents the state of the mode Mb and the group of lines 62 to 65 the state of the mode Mc. When the address control 8 has completed transferring of the last data of the line memories A and B, i.e. the data of 1728th pel, to the mode register A, the address control 8 changes the signal of the line 91 from zero to the positive level, applying to the edge state identification logic 16 an indication of completion of the reading out of scan data of one scan line. The outputs from AND gates 111 to 125 and 131 to 145 each represent an identified edge state. When an edge state has been identified, the output from only one of the AND gates 111 to 125 and 131 to 145 becomes of the positive level and the outputs from the other AND gates remain at zero level. For instance, when signals on the lines 57, 60 and 65 are of the positive level, only the output from the AND gate 111 has the positive level and a signal on the line 105 becomes of the positive level, indicating that the Third state ($E_3$) has been identified.

FIGS. 15 and 16 illustrate logic circuits 16' and 16" realizing the algorithm shown in Table 1. In FIGS. 15 and 16, arrows attached to the outputs of the AND gates represent OR functions. The output lines 101 to 105 of the AND gates 111 to 125 and 131 to 145 each indicate an edge state. When the line 101 has the positive level, it indicates the First state ($E_O$) in which the difference is equal to zero; when the line 102 has the positive level, it indicates the First state ($E_+$) in which the polarity of the difference is plus; when the line 103 has the positive level, it indicates the First state ($E_-$) in which the polarity of the difference is minus; when the line 104 has the positive level, it indicates the Second state ($E_2$); and when the line 105 has the positive level, it indicates the Third state ($E_3$).

The lines 101 to 105 are connected to an OR gate 146 and, when an edge state has been identified, the output 83 from the OR gate 146 becomes of the positive level.

Where no edge state is identified, the output 83 remains at zero level.

When the output 106 from the AND gate 121 or 141 becomes of the positive level, it indicates that reading out of one scan line has been completed but that no edge state has been identified.

FIG. 17 illustrates, in block form, code generator circuits 17-20. Upon identification of the First state in which the difference is zero, the signal on the line 101 becomes of the positive level and the polarity code generator 19 generates a digital output "1" shown in Table 6 and applies it to an OR gate 152 in accordance with a shift pulse on a line 153. After the abovesaid 1-bit code has been produced, the polarity code generator 19 controls a code control 151 through a line 154 to provide in the line 84 a pulse indicative of completion of encoding of one state.

Upon identification of the First state $E_+$ or $E_-$ in which the polarity of the difference is positive or negative, the line 102 or 103 becomes of the positive level and the polarity code generator 19 applies to the OR gate 152 a digital output "010" or "011" shown in Table 6 in accordance with the shift pulse on the line 153. After the 3-bit polarity code has been sent, the polarity code generator 19 drives the difference code generator 18 through a line 155. The difference code generator 18 receives the content of the RL counter through the line 88 to produce a code corresponding to Table 5. Upon completion of encoding of the First state $E_+$ or $E_-$, the difference code generator 18 drives the coder control 151 through a line 158 to provide in the line 84 a pulse indicative of completion of encoding of one state.

Upon completion of the Second state $E_2$, the signal of the line 104 becomes of the positive level to drive the state code generator 17, applying a digital output "001" shown in Table 6 to the OR gate 152 in accordance with the pulse on the line 153. After the 3-bit code has been produced, the state code generator 17 controls the coder control 151 through a line 157 to provide in the line 84 a pulse representative of completion of encoding of one state.

Upon identification of the Third state $E_3$, the signal of the line 105 becomes of the positive level to drive the state code generator 17, applying a digital output "000" shown in Table 6 to the OR gate 152 in accordance with the pulse on the line 153. After sending out the 3-bit code, the state code generator 17 drives the RL code generator 20 through a line 156. In a first step of its operation, the RL code generator 20 reads out the content of the RL register 13 through a line 89 and converts it into a code based on Table 4, providing the RL code in accordance with the shift pulse on the line 153. In the second step, the RL code generator 20 encodes the content of the RL counter 12 through a line 88 to apply a code shown in Table 4 to the OR gate 152 in accordance with the shift pulse on the line 153. Having completed encoding of the Third state, the RL code generator 20 drives the coder control 151 through a line 159 to provide on the line 84 a pulse representative of completion of encoding of the state.

The output from the OR gate 152 is transferred to the buffer memory (S) 220 (FIG. 1) through the line 21.

Figure 18:
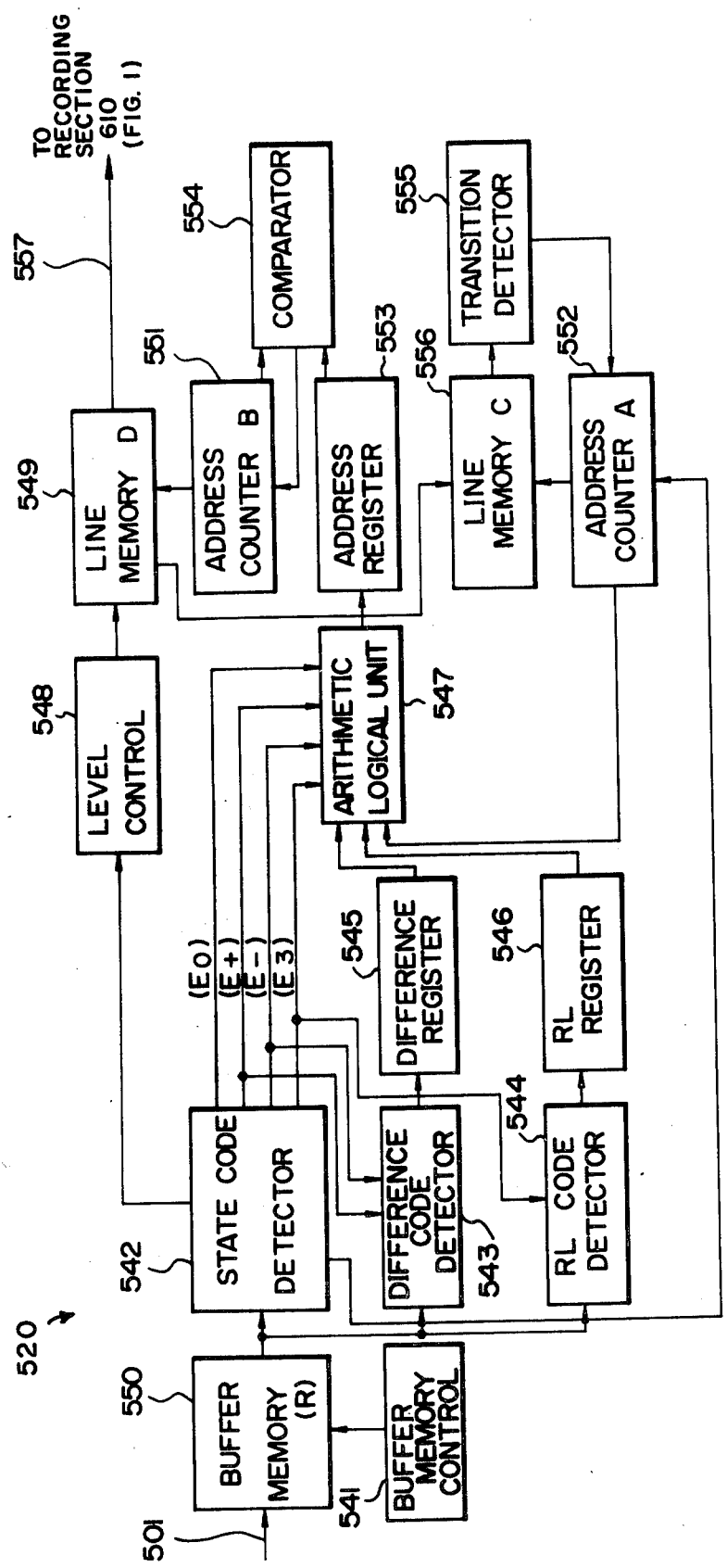
FIG. 18 is a block diagram of a decoder illustrating an embodiment of this invention.

FIG. 18 is a block diagram illustrating a preferred embodiment of the decoder section 520 (FIG. 1) for use in this invention.

In FIG. 18, reference numeral 501 indicates an input line of the received data; 550 designates a buffer memory (R); 541 identifies a buffer memory control; 542 denotes a state code detector; 543 represents a difference code detector; 544 shows an RL code detector; 545 refers to a difference register; 546 indicates an RL register; 547 designates an arithmetic logical unit; 548 identifies a level control; 549 denotes a line memory D; 556 represents a line memory C; 551 shows an address counter B; 552 refers to an address counter A; 553 indicates an address register; 554 designates a comparator; and 555 identifies a transition detector. The level control 548 inverts its output level every time a transition point is written in the line memory D 549. When it is desired to start decoding of a scan line, the abovesaid output is set at a signal level representative of white.

After the received codes are stored in the buffer memory 550 under the control of the buffer memory control 541, when the beginning of the current line is in the First state $E_+$, "010" is applied to the state code detector 542 for detecting a polarity code and a state code in accordance with the code assignment of Table 6, so that the difference code detector 543 is operated to detect a difference code, for example, "1" in accordance with the code assignment of Table 5, and a decoded difference "30 1" is set in the difference register 545. The decoded scan data of the preceding line are set in the line memory C 556 and when a transition point of the scan data is detected by the transition detector 555, "+1" of the difference register 545 is added (via arithmetic logical unit 547) to the current value of the address counter A 552 which is represented with eleven bits, and the result of this addition is set in the address register 553. And the content of the address counter B 551 for the current line is counted up by under the control of the comparator 554 until it becomes equal to the address value of the address register 553 and the content of the line memory D 549 is made equal to the output from the level control 548 up to the abovesaid address to complete write, thus inverting the output from the level control 548.

Further, in the case of the state $E_O$ in which the difference is zero in the First state, a code "1" is applied to the state code detector 542, so that the 11-bit content of the address counter A 552 is set in the address register 553 through the arithmetic logical unit 547.

Next, in the case of the Second state $E_2$, a code "001" is applied to the state code detector 542 but, in this case, there is no need of addition and subtraction of address data. In the transition detector 555, two transition points are detected, only during which the address counters 552 and 551 are counted up to write in the line memory D 549 at the same level as the output from the level control 548. Meanwhile, the output value of the level control 548 remains constant.

In the Third state $E_3$, since a rung-length code based on Table 4 is applied following a state code "000", the RL code detector 544 is operated. In accordance with Table 4, when the run length is 1, 2, 3 or 4, a run-length code "100," "101," "110" or "111" is successively applied, so that it is added to the value of the address counter A 552, the result is set in the address register 553, and the line memory 549 is written up to an initially set address at the same signal level as the output level from the level control 548. Then, the output from the level control 548 is inverted and, up to the address next set, the memory 549 is written at the same signal level as the output level of the level control 548.

Thus, when decoding of the current line has been completed, the reconstructed scan data are applied to the recording section 610 (FIG. 1) through a line 557 (FIG. 18) and, at the same time, the contents of the line memory D 549 are shifted as the scan data of the preceding line to the line memory C 556. Next, codes are sequentially detected from the buffer memory 550 and the scan data decoded next are stored as the scan data of the current line in the line memory D 549.

It is also possible to employ the following steps:

After decoding, the content of the line memory D 549 is used as the preceding line and the input line is switched to store the next scan line in the line memory C 556 and it is decoded as the current line.

Figure 19:
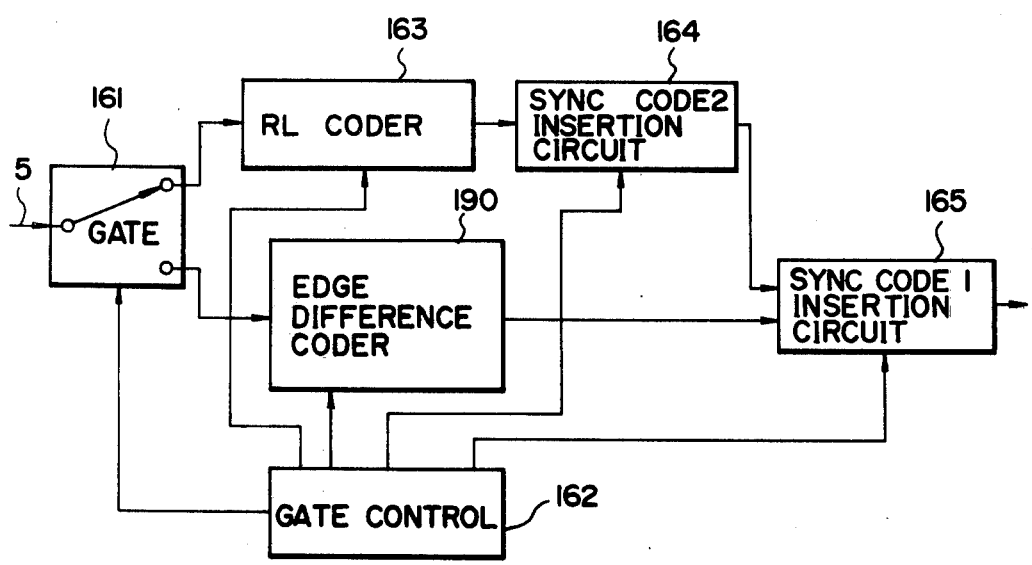
FIG. 19 is a block diagram of a coder showing another embodiment of this invention.
Figure 20:
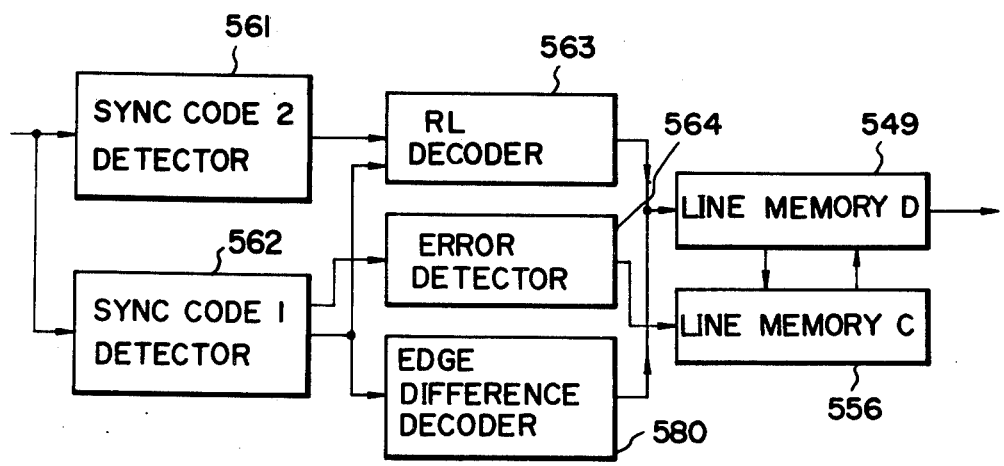
FIG. 20 is a block diagram of a decoder showing another embodiment of this invention.

FIGS. 19 and 20 are block diagrams showing a coder section 120 (FIG. 1) and a decoder section 520 in accordance with a second embodiment of this invention. A facsimile scan data on input line 5 are connected to an RL coder 163 through a gate 161 every K lines under the control of a gate control 162. At this time, a SYNC code 2 insertion circuit 164 inserts a second control code SYNC 2 in a coded bit sequence which is derived from the coder and thereafter an RL coder 163 encodes the scan line (No. 1 scan line) into run-length codes, the gate 161 being connected to an edge difference coder 190 of this invention. In connection with No. 2 to No. K scan lines, edge difference coding according to this inventio is achieved and, immediately before coding of each scan line, a first control code SYNC 1 is inserted into the coded bit sequence by a SYNC code 1 insertion circuit.

On the decoder side, (FIG. 20) when the second control code SYNC 2 is detected by a SYNC code 2 detector 561, the run lengths are decoded by an RL decoder by one scan line (No. 'scan line) and the reconstructed scan data are written in a line memory D 549. Upon completion of decoding of the No. 1 scan line, the content of the line memory D 549 is transferred to a line memory C 556. Thereafter, No. ', No. 3 . . . No. K scan lines are sequentially decoded by an edge difference decoder 580 of this invention using the content of the line memory C 556. Immediately before decoding of each scan line, the first control code SYNC 1 is detected by a SYNC code 1 detector 562 and the presence or absence of a code error is detected by a code error detector 564. When a code error has been detected, the scan data stored in the line memory C 556 are sent in place of the scan data stored in the line memory D 549. Then, when the second control code SYNC 2 has been detected, an ordinary decoding operation is started to recover from the code error state.

Figure 21B:
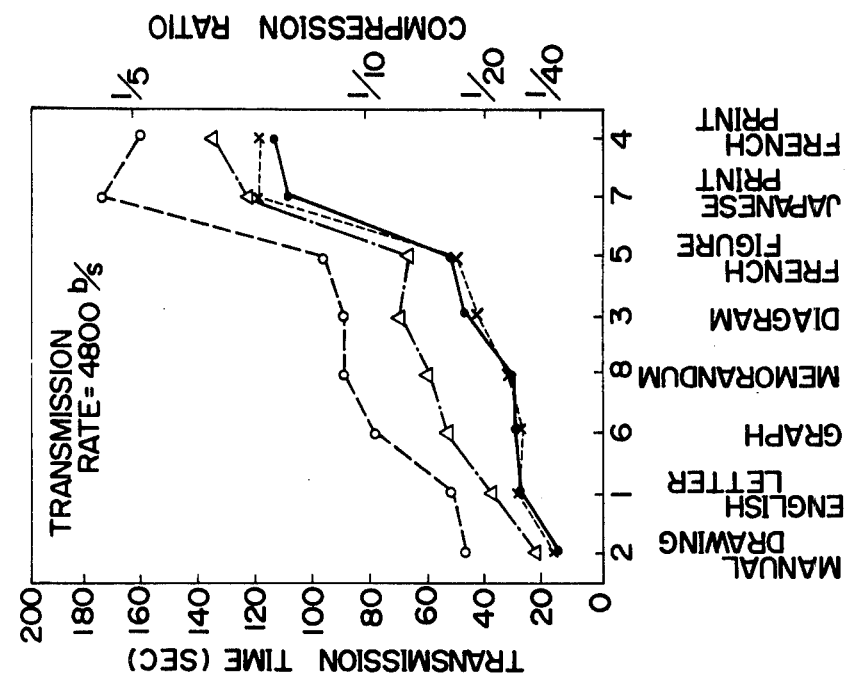
FIGS. 21A and 21B are graphs showing the results of simulation of representative coding schemes.
Figure 21A:
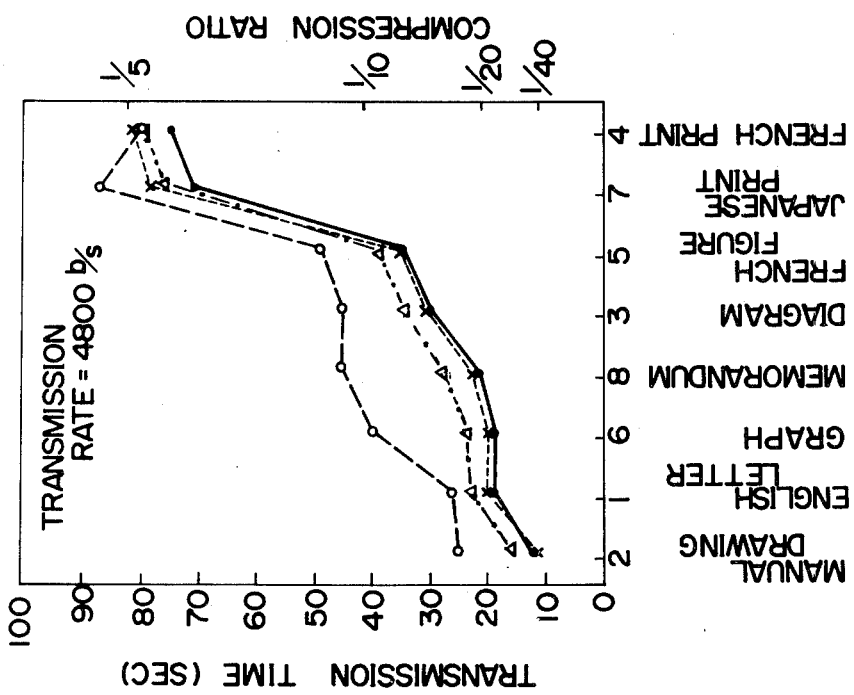

FIGS. 21A and 21B show the results of compression of the compression ratios and transmission times of the edge difference coding scheme of this invention and other schemes by the use of computer simulation.

FIG. 21A shows the transmission time and compression ratio with respect to kinds of test documents proposed in CCITT SGXIV in the case of the sampling density being 9 pels/mm×4/mm, and FIG. 21B shows the transmission time and compression ratio with respect to the abovesaid test documents in the case of the sampling density being 9pels/mm×8/mm. The transmission rate was 4800 b/s. The white circles connected by the dashed line indicate the one-dimensional RL coding scheme, triangles connected by the one-dot chain line indicate the PDQ scheme of the aforesaid British patent, crosses connected by the dotted line indicate the relative address coding scheme, and black circles connected by the solid line indicate the edge difference coding scheme of this invention.

As is evident from FIG. 21B, in the case of high sampling density, the compression ratio or transmission time of the scheme of this invention is about ½ of that of the one-dimensional RL coding scheme in the various documents. The relative address coding scheme is inferior to the scheme of this invention in the case of a complicated document and the PDQ scheme is also inferior, as to transmission time, to the scheme of this invention by about 12 percent or so. In the case where the sampling density is coarse, the PDQ system is substantially equal to the one-dimensional RL coding scheme in terms of the compression ratio and is low in efficiency but, in the case of coarse sampling density and a complicated document, the scheme of this invention is more excellent than any of the abovesaid schemes. Moreover, in the case of a simple document, the scheme of this invention is the most preferable, along with the relative address coding scheme. Thus, in the compression ratio and transmission time, the coding scheme of this invention is, on the average, excellent with respect to both simple and complicated documents. Further, this invention is equal to or more preferable than the other schemes in terms of ease of implementation.

It will be apparent that many modifications and variations may be effected without departing from the scope of novel concepts of this invention.

What is claimed is:

1. A method for developing a facsimile signal for transmission by sequential edge differential coding of picture information contained on a document, said picture information corresponding to a plurality of picture elements grouped into successive lines on said document, each picture being of a first level or a second level of optical character, said method comprising the steps of:
   scanning successive said picture elements along each of said successive lines to generate scan data representing said optical character of said picture elements;
   progressively storing said scan data of each successive line as current line information to be coded, and said scan data of the immediately preceding scanned line as preceding line information;
   simultaneously accessing corresponding said stored current line information and said stored preceding line information to determine, for each of said current line and said preceding line, the presence of transitions in said optical character between adjacent ones of said successively scanned picture elements;
   identifying, for each successive two of said determined transitions in said current line information and preceding line information, whether said transitions are of:
   a. a First state in which the two transition points exist on the preceding line and the current line, respectively,
   b. a Second state in which the two transition points exist only on the preceding line, and
   c. a Third state in which the two transition points exist only on the current line;
   measuring:
   d. as to each First state, only the number of picture elements between the locations of the two transition points on the preceding line and the current line, and the direction of the difference, and
   e. as to each Third state, the first distance between the second transition point in the state immediately preceding the Third state and the first transition point in the Third stage, and the second distance between the first transition point in the Third state and the second transition point in the Third state; and
   generating digital outputs respectively comprising:
   f. in the First stage, a signal indicating the number of picture elements measured in step d., and identifying the First state,
   g. in the Second state, a signal identifying the Second state, and
   h. in the Third state, a signal indicating the first and second distances, and identifying the Third state.

2. The method according to claim 1, comprising the additional step of detecting whether or not the second transition point occurs at the same location on the current line and the preceding line after the first transition point occurs on one of the preceding line and the current line, and establishing a state identification priority for each of the First, Second and Third states in anticipation of the case where the second transition point occurs at the same location on the both scan lines.

3. The method according to claim 2, wherein the step of generating digital outputs in the Third state comprises generating a code indicating the Third state and codes indicating the first and second distances.

4. The method according to claim 3, wherein the step of generating digital outputs in the First state comprises generating a pair of codes including a first code indicating the First state and a second code indicating the number of picture elements measured in step d, and, when the difference is not zero, generating a polarity code as a part of the digital output.

5. The method according to claim 3, wherein the step of generating digital outputs in the First state comprises generating a selected one of a first code indicating that the number of picture elements measured in step d. is zero, and a second code indicating that the number of picture elements measured in step d. is not zero and including a polarity code.

6. A method for developing a facsimile signal for transmission by sequential edge differential coding of picture information contained on a document, said picture information corresponding to a plurality of picture elements grouped into successive lines on said document, each picture element being of a first level or a second level of optical character, said method comprising the steps of:
   scanning successive said picture elements along each of said successive lines to generate scan data representing said optical character of said picture elements;
   progressively storing said scan data of each successive line as current line information to be coded, and said scan data of the immediately preceding scanned line as preceding line information;
   simultaneously accessing corresponding said stored current line information and said stored preceding line information to determine, for each of said current line and said preceding line, the presence of transitions in said optical character between adjacent ones of said successively scanned picture elements;
   identifying, for each successive two of said determined transitions in said current line information and preceding line information, whether said transitions are of:
  a. a First state in which the two transition points exist on the preceding line and the current line, respectively,
  b. a Second state in which the two transition points exist only on the preceding line, and
  c. a Third state in which the two transition points exist only on the current line;

measuring:
  d. as to each First state, only the number of picture elements between the locations of the two transition points on the preceding line and the current line, and the direction of the difference, and
  e. as to each Third state, the first distance between the second transition point in the state immediately preceding the Third state and the first transition point in the Third state, and the second distance between the first transition point in the Third state and the second transition point in the Third state; and generating digital outputs respectively comprising:
  f. in the First state, a signal indicating the number of picture elements measured in step d., and identifying the First state,
  g. in the Second state, a signal identifying the Second state, and
  h. in the Third state, a signal indicating the first and second distances, and identifying the Third state;

said method further comprising the steps of detecting whether or not the second transition point occurs at the same location on the current line and the preceding line after the first transition point occurs on one of the preceding line and the current line, and establishing a state identification priority for each of the First, Second and Third states in anticipation of the case where the second transition point occurs at the same location on the both scan lines;

said method including the additional steps of subdividing the scan lines, each represented by binary picture elements having one of said first and second levels, into predetermined segments; generating a first control code for detecting errors immediately before coding of each scan segment; generating a self-synchronized second control code for recovery from an error state immediately before coding of every K (K=1, 2, 3, ...) scan lines; and coding the first scan segment of every K scan lines using only picture signal information of the scan segment without using picture signal information of the preceding scan line.

7. An apparatus for developing a facsimile signal for transmission by sequential edge differential coding of picture information contained on a document, said picture information corresponding to a plurality of picture elements grouped into successive lines on said document, each picture element being of a first level or a second level of optical character, said apparatus comprising:

means for scanning successive said picture elements along each of said successive lines to generate scan data representing said optical character of said picture elements;

first line memory means for storing said scan data of said preceding line, the latter scan data including transition points between said first level and said second level adjacent to said current line to be coded, and which scan data comprise a two-level signal;

second line memory means for storing said scan data of the current line to be coded, the latter also including transition points between said first level and said second level adjacent to said preceding line, and which scan data also comprise a two-level signal;

mode data developing means responsive to said scan data from said first and second line memory means, and to said transition points included therein, for developing successive mode data representing the combined optical character of corresponding picture elements from said preceding line and said current line;

mode comparator means for comparing each successive mode data developed by said mode data developing means with the immediately preceding mode data developed by said mode data developing means so as to detect transitions therebetween;

state identification logic means for indicating a first state when two transition points occur successively along said scan line of said current line and said scan line of said preceding line, respectively, a second state when said successively occurring two transition points occur only on said preceding line, and a third state when said successively occurring two transition points occur only on said current line;

run-length counter means for counting the number of picture elements having the same mode data until a picture element of a different mode data is encountered to develop a first count value, and for counting the number of picture elements from the second of said successively occurring two transition points for the preceding mode data to the first of said successively occurring two transition points for the current mode data to develop a second count value;

state code generator means for generating state codes indicating the indentification of said second and third states, respectively;

polarity code generator means for generating, upon identification of said first state, one of a plus, minus or zero code in accordance with whether said transition point of said preceding line respectively precedes, coincides with, or succeeds corresponding said transition point of said current line;

difference code generator means for converting, in the case of identification of said first state, the second count value of said run-length counter means into a difference code; and run-length code generator means for sequentially converting, in the case of identification of said third state, the first count value of said run-length counter means into a run-length code;

wherein said mode data developing means comprises:
  a first mode register connected to both said first and second line memory means for receiving successive, combined outputs of said first and second line memory means, said successive combined outputs identifying the combined optical character of successive, corresponding picture elements of said preceding and current lines, said first mode register providing, as its own output, each successive combined output of said first and second line memory means; and a second mode register connected to said output of said first mode register for receiving each successively provided combined output of said first and second line memory means;

said mode comparator means being connected to said first and second mode registers for comparing each combined output sequentially provided by said first and second line memory means to said first mode register with the immediately preceding sequentially provided combined output of said first and second line memory means as held by said second mode register.

8. The apparatus according to claim 7, further comprising run-length register means connected to said run-length counter means for storing said first and second count values therefrom, said run-length register means further providing said first count value and said second count value to said run-length code generator means and said difference code generator means, respectively.

9. An apparatus for developing a facsimile signal for transmission by sequential edge differential coding of picture information contained on a document, said picture information corresponding to a plurality of picture elements grouped into successive lines on said document, each picture element being of a first level or a second level of optical character, said apparatus comprising:

means for scanning successive said picture elements along each of said successive lines to generate scan data representing said optical character of said picture elements;

means for progressively storing said scan data of each successive line as current line information to be coded, and said scan data of the immediately preceding scanned line as preceding line information;

means for simultaneously accessing corresponding said stored current line information and said stored preceding line information to determine, for each of said current line and said preceding line, the presence of transitions in said optical character between adjacent ones of said successively scanned picture elements;

means for identifying:
  a first state in response to the two transition points existing on the preceding line and the current line, respectively,
  a second state in response to the two transition points existing only on the preceding line, and
  a third state in response to the two transition points existing only on the current line;

means for measuring:
  as to each first state, only the number of picture elements between the locations of the two transition points on the preceding line and the current line, respectively, and the direction of the difference, and
  as to each third state, the first distance between the second transition point in the state immediately preceding the third state and the first transition point in the third state, and the second distance between the first transition point in the third state and the second transition point in the third state; and means for generating digital outputs respectively comprising:

in the first state, a signal indicating the number of picture elements measured as to each first state, and identifying the first state, in the second state, a signal identifying the second state, and in the third state, a signal indicating the first and second distances, and identifying the third state.

10. An apparatus for developing a facsimile signal in accordance with claim 9, wherein said means for generating digital outputs in the first state comprises a state code generator for generating a code indicating the first state, a difference code generator for generating a code indicating the number of picture elements measured by the measuring means as to each first state, and a polarity code generator responsive to said number of picture elements measured by said measuring means being not equal to zero for generating a polarity code as a part of the digital output.

11. An apparatus for developing a facsimile signal in accordance with claim 9, wherein said means for generating digital outputs in the third state comprises a state code generator for generating a code indicating the third state, and a difference code generator for generating codes indicating the first and second distances, respectively.

12. The apparatus according to claim 9, comprising means for detecting whether or not the second transition point occurs at the same location on the current and preceding line after the first transition point occurs on one of the preceding line and the current line, and means for establishing a state identification priority for each of the first, second and third states in anticipation of the case where the second transition point occurs at the same location on both scan lines.

13. The apparatus according to claim 12, wherein said means for generating digital outputs in the first state comprises a state code generator for generating a code indicating the first state, a difference code generator for generating a code indicating the number of picture elements measured by the measuring means as to each first state, and a polarity code generator responsive to said number of picture elements measured by said measuring means being not equal to zero for generating a polarity code as a part of the digital output.

14. The apparatus according to claim 12, wherein said means for generating digital outputs in the third state comprises a state code generator for generating a code indicating the third state, and a difference code generator for generating codes indicating the first and second distances, respectively.

15. The apparatus according to claim 14, wherein said means for generating digital outputs in the first state comprises a state code generator for generating a code indicating the first state, a difference code generator for generating a code indicating the number of picture elements measured by the measuring means as to each first state, and a polarity code generator responsive to said number of picture elements measured by said measuring means being not equal to zero for generating a polarity code as a part of the digital output.

16. The apparatus according to claim 14, wherein said means for generating the digital outputs in the first state comprises a difference code generator responsive to said number of picture elements measured by said measuring means being equal to zero for generating a first code, and responsive to said number of picture elements measured by said measuring means being not equal to zero for generating a second code, and further comprising a polarity code generator responsive to said generation of said second code by said state code generator for generating a polarity code indicating the direction of the difference.

17. An apparatus for developing a facsimile signal for transmission by sequential edge differential coding of picture information contained on a document, said picture information corresponding to a plurality of picture elements grouped into successive lines on said document, each picture element being of a first level or a second level of optical character, said apparatus comprising:
means for scanning successive said picture elements along each of said successive lines to generate scan data representing said optical character of said picture elements;
means for progressively storing said scan data of each successive line as current line information to be coded, and said scan data of the immediately preceding scanned line as preceding line information;
means for simultaneously accessing corresponding said stored current line information and said stored preceding line information to determine, for each of said current line and said preceding line, the presence of transitions in said optical character between adjacent ones of said successively scanned picture elements;
means for identifying:
a first state in response to the two transition points existing on the preceding line and the current line, respectively,
a second state in response to the two transition points existing only on the preceding line, and
a third state in response to the two transition points existing only on the current line; means for measuring:
as to each first state, only the number of picture elements between locations of the two transition points on the preceding line and the current line, respectively, and the direction of the difference, and
as to each third state, the first distance between the second transition point in the state immediately preceding the third state and the first transition point in the third state, and the second distance between the first transition point in the third state and the second transition point in the third state; and
means for generating digital outputs respectively comprising:
in the first state, a signal indicating the number of picture elements measured as to each first state, and identifying the first state,
in the second state, a signal identifying the second state, and
in the third state, a signal indicating the first and second distances, and identifying the third state;
said system further comprising:
means for detecting whether or not the second transition point occurs at the same location on the current preceding line after the first transition point occurs on one of the preceding line and the current line, and means for establishing a state identification priority for each of the first, second and third states in anticipation of the case where the second transition point occurs at the same location on both scan lines;
means for subdividing the scan lines, each represented by binary picture elements having one of said first and second levels, into predetermined segments;
means for generating a first control code for detecting errors immediately before coding of each scan segment;
means for generating a self-synchronized second control code for recovery from an error state immediately before coding of every K (K=1, 2, 3, ...) scan lines; and
means for coding the first scan segment of every K scan lines using only picture signal information of the scan segment without using picture signal information of the preceding scan line.

* * * * *

UNITED STATES PATENT AND TRADEMARK OFFICE
CERTIFICATE OF CORRECTION

PATENT NO. : 4,156,880

DATED : May 29, 1979

INVENTOR(S) : Toyomichi Yamada

It is certified that error appears in the above-identified patent and that said Letters Patent are hereby corrected as shown below:

*In the Abstract, line 15, "later" should be -- latter --;

Col. 5, lines 10-11, delete "corresponding;

Col. 6, line 40, "san" should be -- scan --;

Col. 6, line 65, "in" should be -- In --;

Col. 8, line 67, "$S_1 \cdot D(0)$" should be -- $S_1 \cdot D(0)$ --;

*Col. 9, line 62, "sheme" should be -- scheme --;

Col. 10, line 5, "$M_0 \cdot \cdot M_1 \cdot \cdot M_0$" should be -- $M_0 \rightarrow M_1 \rightarrow M_0$ --;

Col. 10, line 7, "$M_2 \cdot \cdot M_1 \cdot \cdot M_0$" should be -- $M_2 \rightarrow M_1 \rightarrow M_0$ --;

Col. 10, line 64, "$1_1$" should be -- $\ell_1$ --;

Col. 10, line 65, "$1_2$" should be -- $\ell_2$ --;

Col. 10, line 66, "$1_1$" and "$1_2$" should be -- $\ell_1$ -- and -- $\ell_2$ --;

UNITED STATES PATENT AND TRADEMARK OFFICE
CERTIFICATE OF CORRECTION

PATENT NO. : 4,156,880
DATED : May 29, 1979
INVENTOR(S) : Toyomichi Yamada

It is certified that error appears in the above-identified patent and that said Letters Patent are hereby corrected as shown below:

Col. 11, line 7, "$L(1)$" should be -- $L(\ell)$ --;

Col. 11, line 8, "$1$" should be -- $\ell$ --;

Col. 11, line 52, "$1_3$ (=2) and $1_4$ (=2) should be -- $\ell_3$ (=2) and $\ell_4$ (=2) --;

Col. 11, line 62, "$1_5$ (=2) and $1_6$ (=2)" should be -- $\ell_5$ (=2) and $\ell_6$ (=2) --;

*Col. 12, line 2, "fictitiously" should be -- ficticiously --;

Col. 12, line 68, "$L(1)$" should be -- $L(\ell)$ --;

Col. 12, line 68, "$1$" should be -- $\ell$ --;

Col. 13, Table 5, line 14, "$000^{n-1} \ldots 0\ 1$" should be -- $\overline{000^{n-1} \ldots 0}\ 1$ --;

Col. 13, line 58, "(FIG.)" should be -- (FIG. 1) --;

*Col. 13, line 63, "denote" should be -- denotes --;

*Col. 14, line 16, "intercounnecting" should be -- interconnecting --;

UNITED STATES PATENT AND TRADEMARK OFFICE
CERTIFICATE OF CORRECTION

PATENT NO. : 4,156,880
DATED : May 29, 1979
INVENTOR(S) : Toyomichi Yamada

It is certified that error appears in the above-identified patent and that said Letters Patent are hereby corrected as shown below:

Col. 19, line 23, " "30 1" " should be -- "+1" --;

Col. 19, line 53, "rung"length" should be -- run-length --;

Col. 20, line 25, "inventio" should be -- invention --;

Col. 20, line 33, "(No. 'scan line)" should be -- (No. 1 scan line) --;

Col. 20, line 37, "No. '," should be -- No. 2, --.

Signed and Sealed this

Thirteenth Day of November 1979

[SEAL]

Attest:

RUTH C. MASON
Attesting Officer

LUTRELLE F. PARKER
Acting Commissioner of Patents and Trademarks